United States Patent [19]

Malatesta et al.

[11] Patent Number: 5,491,818
[45] Date of Patent: Feb. 13, 1996

[54] SYSTEM FOR MIGRATING APPLICATION DATA DEFINITION CATALOG CHANGES TO THE SYSTEM LEVEL DATA DEFINITION CATALOG IN A DATABASE

[75] Inventors: John A. Malatesta, Alamo; Richard A. Bergquist, Danville, both of Calif.

[73] Assignee: Peoplesoft, Inc., Walnut Creek, Calif.

[21] Appl. No.: 106,765

[22] Filed: Aug. 13, 1993

[51] Int. Cl.⁶ .................................................. G06F 17/30
[52] U.S. Cl. ........................... 395/600; 364/DIG. 1; 364/282.3; 364/282.1
[58] Field of Search ............................................. 395/600

[56] References Cited

U.S. PATENT DOCUMENTS 5,386,559  1/1995  Eisenberg et al. ....................... 395/600

Primary Examiner—Thomas G. Black
Assistant Examiner—Wayne Amsbury
Attorney, Agent, or Firm—Hecker & Harriman

[57] ABSTRACT

The present invention provides the ability to alter data definitions in a Database Management System (DBMS). The present invention provides the ability to maintain DBMS and application catalogs. Alterations can be made to the an application catalog, and the changes propagated to the DBMS catalog based on the differences between like information in the application and DBMS catalogs as identified by the present invention. The present invention provides the ability to test for data loss. That is, the present invention examines the requested alteration and the data that will be affected by the alteration to determine whether or not the alteration will result in the loss of data. If loss of data is possible, alerts can be generated to determine whether or not to proceed with the alterations. The present invention provides two techniques to perform the alterations depending on the ability of the DBMS to perform an alter on the original table without using an intermediate table (i.e., a native alter), or performing the alterations using an intermediate table for a DBMS with limited native alter capabilities.

4 Claims, 27 Drawing Sheets

FIG. 2

AbsenceHist — 202

| Emplid (204) | Reason (206) | BeginDt (208) | ReturnDt (210) | PdUnpaid (212) | DurationHrs (214) | Comments (216) |
|---|---|---|---|---|---|---|
| 00100 | Vacation | 04-Jan-93 | 08-Jan-93 | P | | |
| 00102 | Illness | 05-Apr-93 | 05-Apr-93 | P | 4 | |
| 00104 | Vacation | 06-Jul-93 | 09-Jul-93 | P | | |
| 00106 | Leave | 31-May-93 | 30-Jun-93 | U | | |

AbsenceHist — 202

| Emplid (204) | Reason (306) | BeginDt (208) | ReturnDt (210) | PdUnpaid (312) | DurationHrs (314) | Comments (316) |
|---|---|---|---|---|---|---|
| 00100 | Vacation | 04-Jan-93 | 08-Jan-93 | P | | |
| 00102 | Illness | 05-Apr-93 | 05-Apr-93 | P | 4.5 | |
| 00104 | Vacation | 06-Jul-93 | 09-Jul-93 | P | | |
| 00106 | Leave | 31-May-93 | 30-Jun-93 | U | | |

320, 322, 324, 326

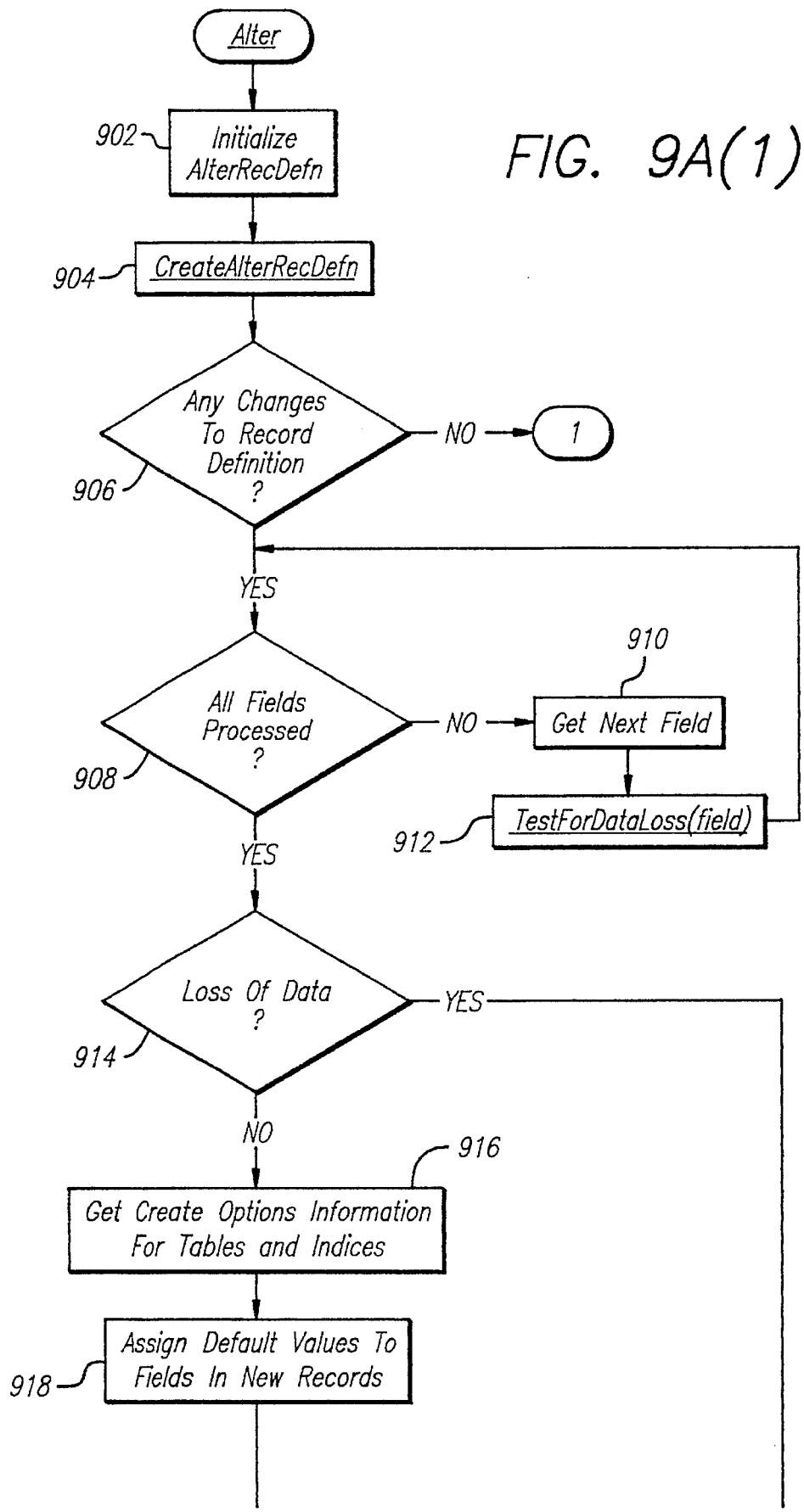
FIG. 9A(1)

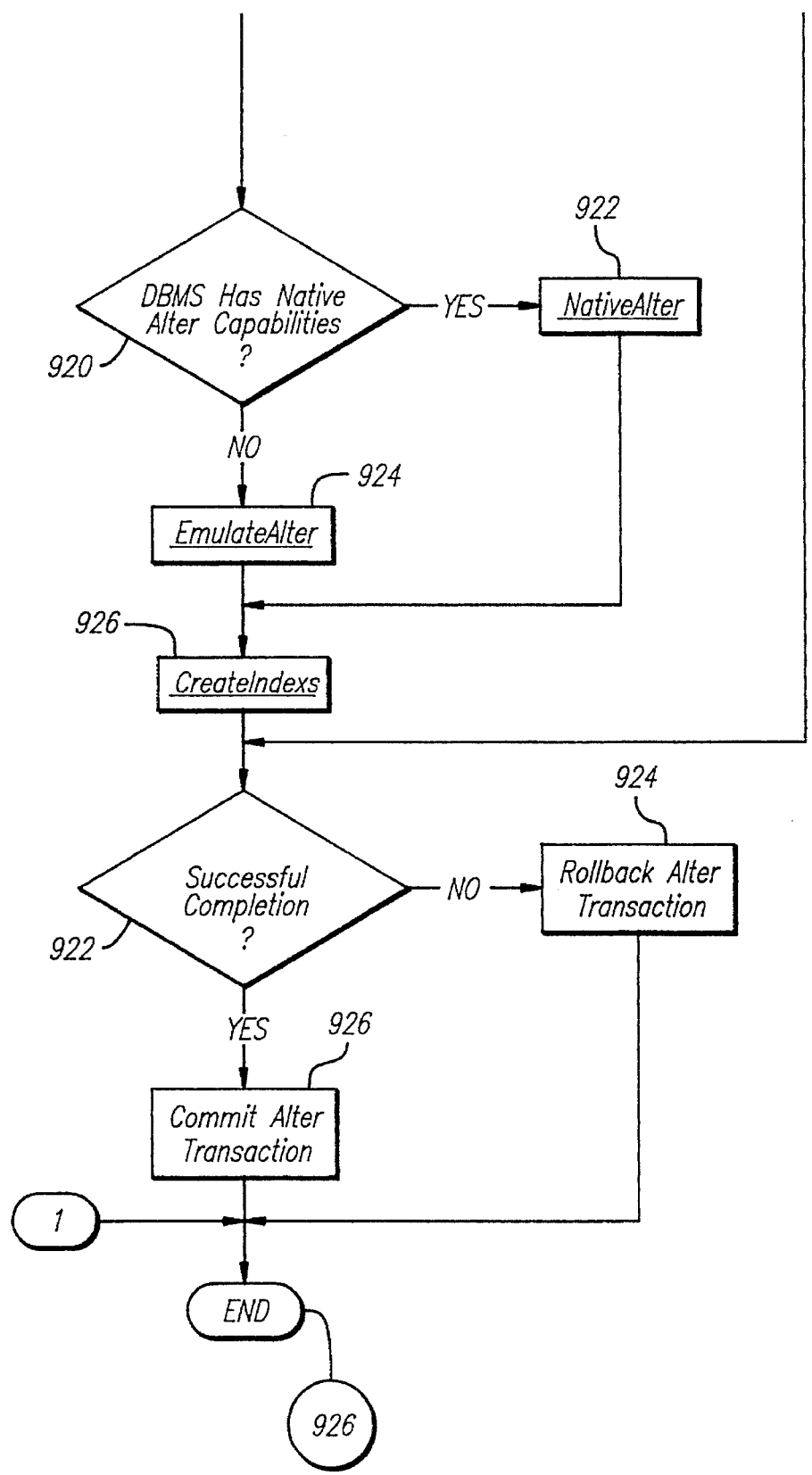
FIG. 9A(2)

FIG. 9C(1)
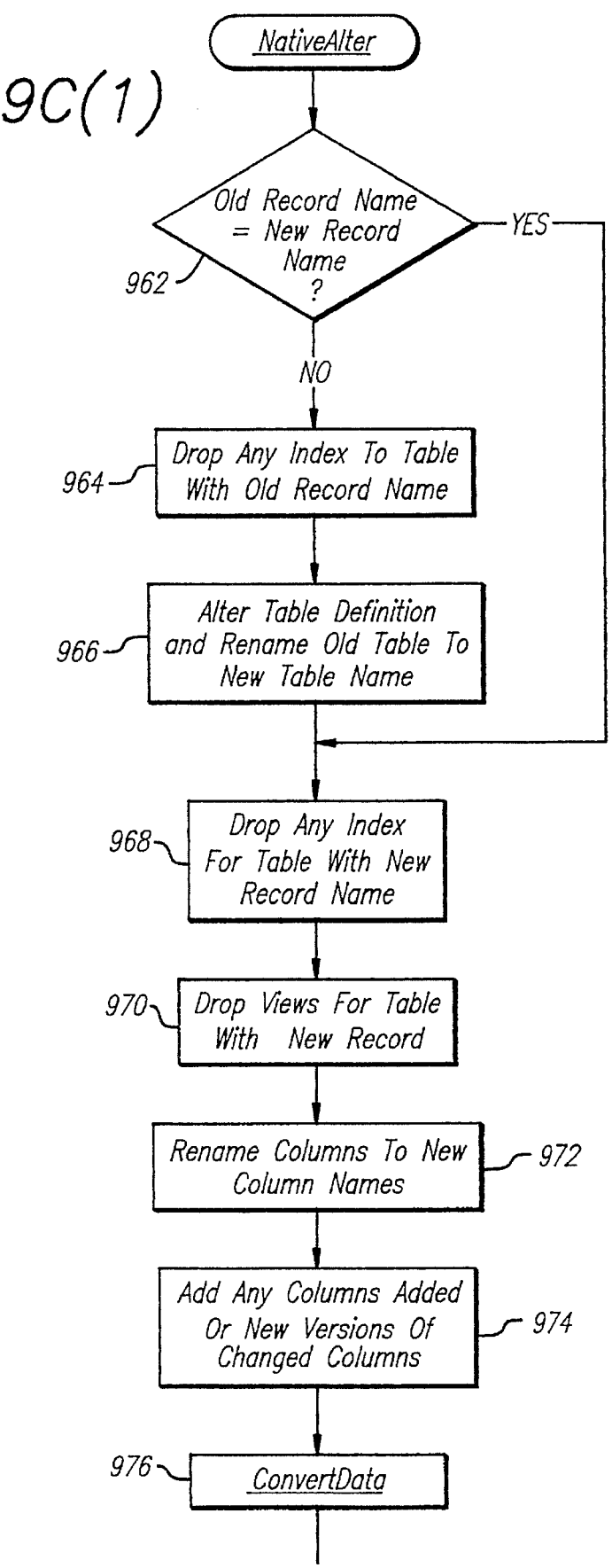

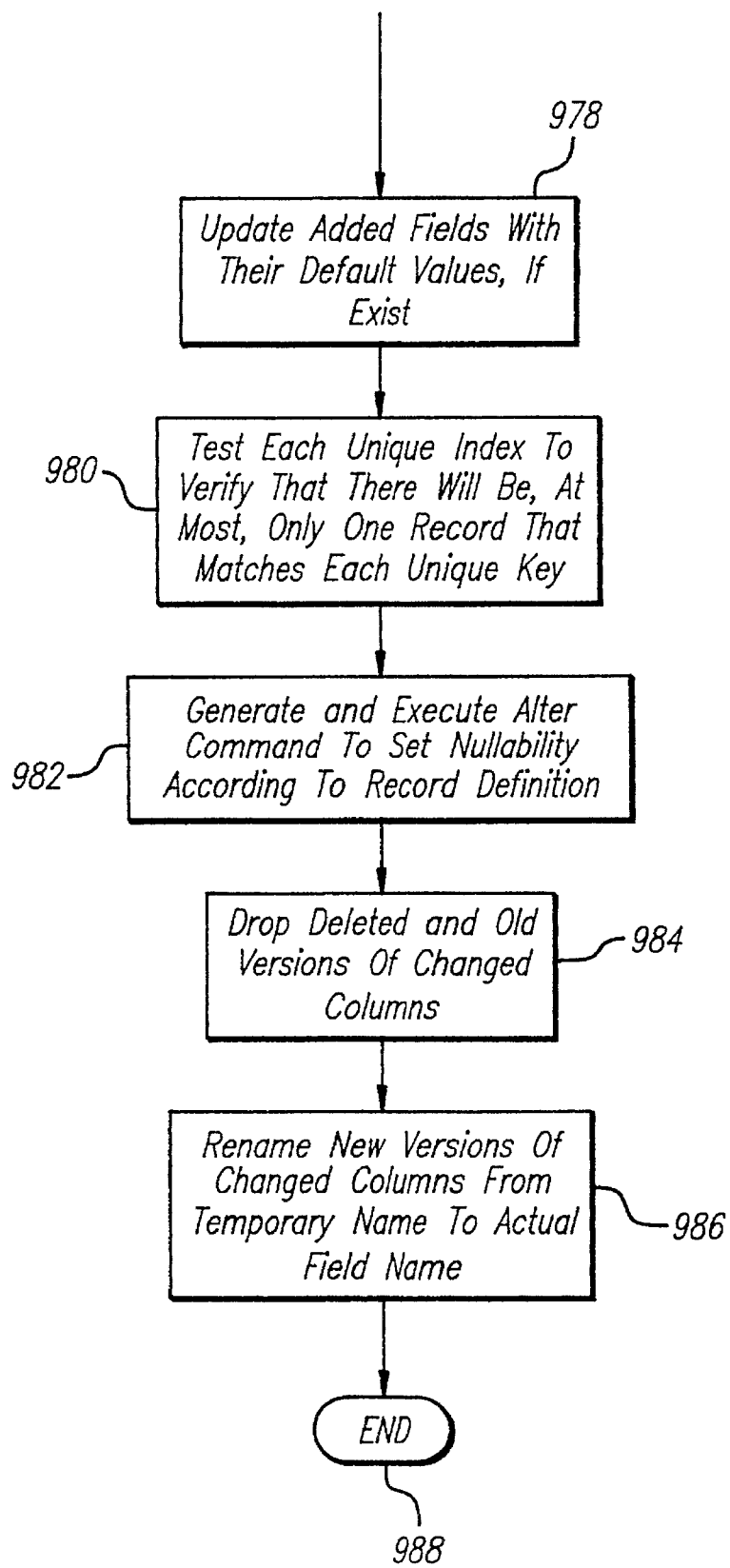
FIG. 9C(2)

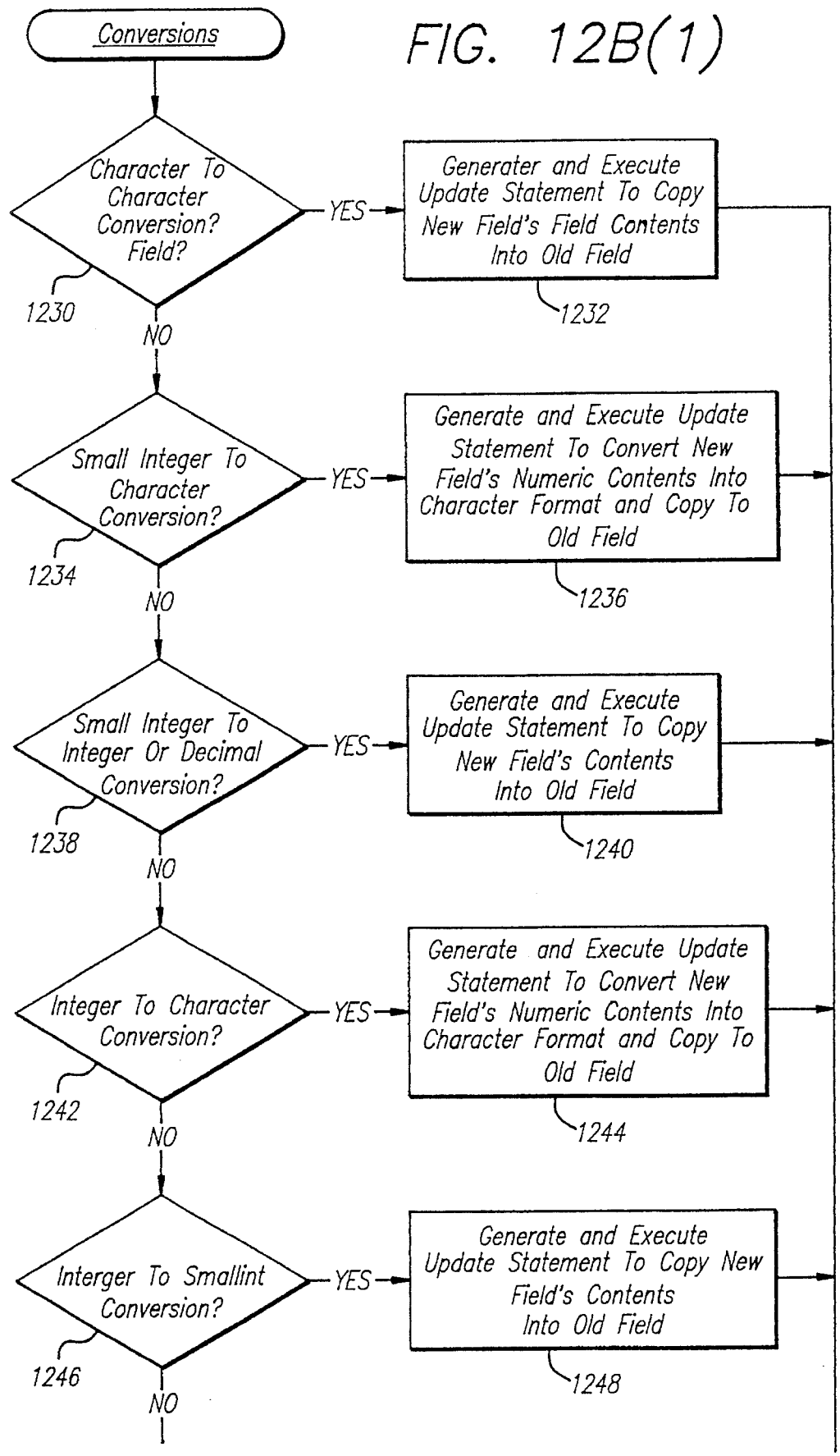
FIG. 12B(1)

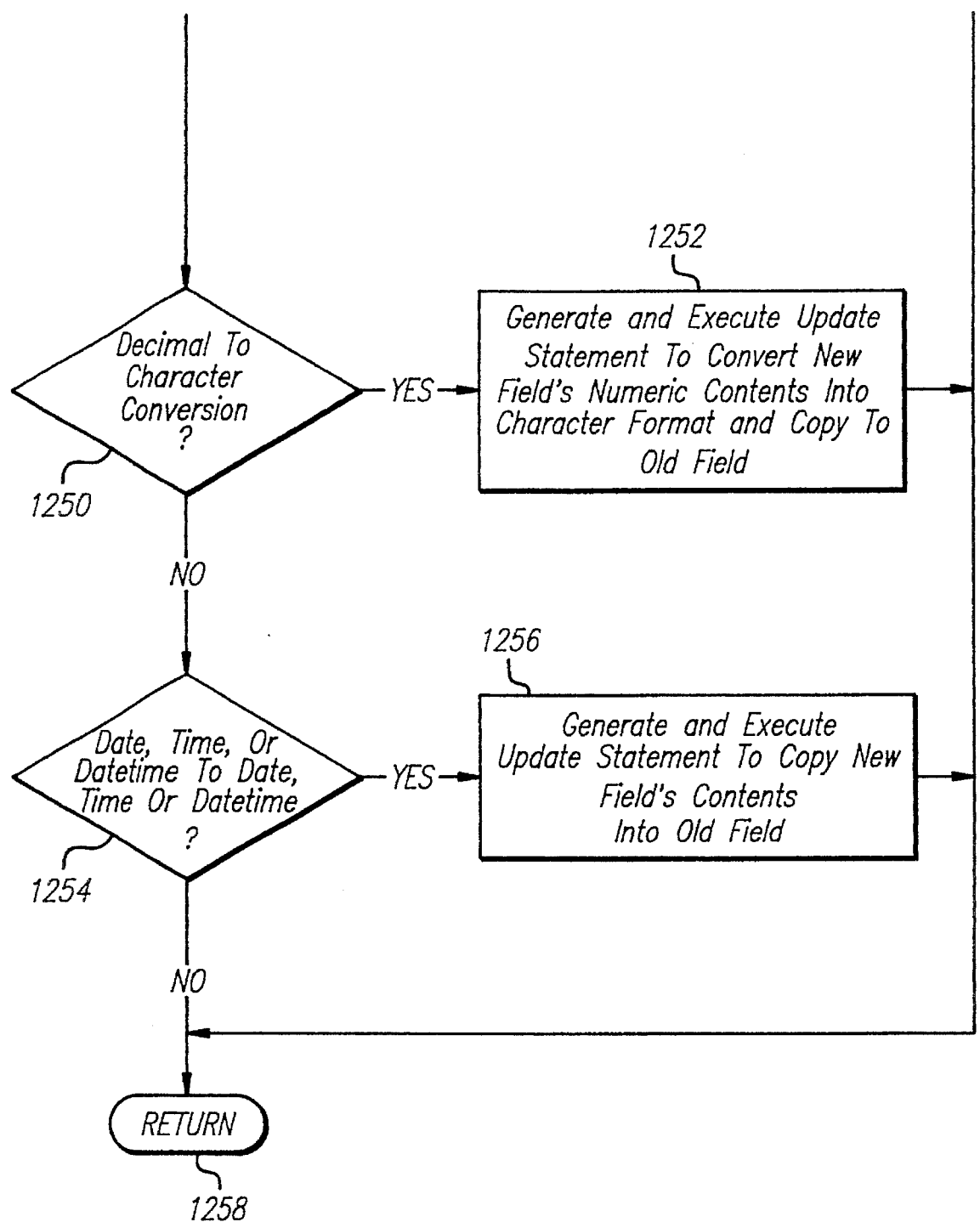
FIG. 12B(2)

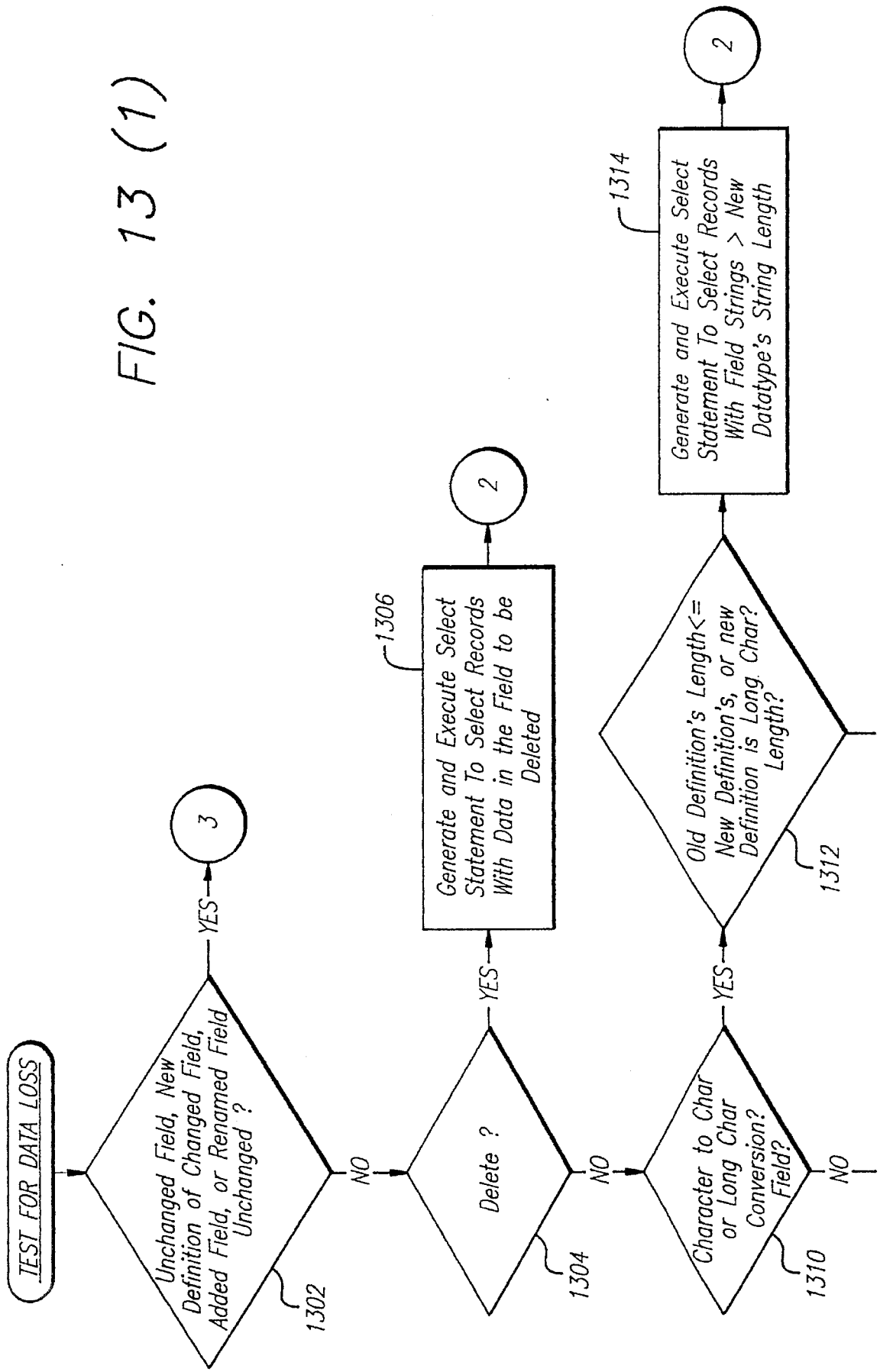
FIG. 13 (1)

Data Type Conversions:

| Old Format | New Format | | | | | | | |
|---|---|---|---|---|---|---|---|---|
| | RDM_COL CHAR | RDM_COL LONG | RDM_COL SMALLINT | RDM_COL INTEGER | RDM_COL DECIMAL | RDM_COL DATE | RDM_COL TIME | RDM_COL DATETIME |
| RDM_COL CHAR | OK If New Big Enough, Else Error | OK | Error | Error | Error | Error | Error | Error |
| RDM_COL LONG | Error | OK | Error | Error | Error | Error | Error | Error |
| RDM_COL SMALLINT | OK If Char (>6) Or All Data Fits | Error | OK | OK if signed, or alt > 0 | OK if Enough Integer Positions | Error | Error | Error |
| RDM_COL INTEGER | OK If Char (>11) Or All Data Fits | Error | OK If Data Fits | OK If Data Fits | Error | Error | Error | Error |
| RDM_COL DECIMAL | Not OK If Decimal Digits, Otherwise OK If New Size > Old Size, Or if All Data Fits | Error | OK if New Integer and Decimal size both big enough, warning if new has fewer decimal digits, error if not all data fits | OK if new Integer and Decimal size both big enough, warning if new has fewer decimal digits, error if not all data fits | OK if new Integer and Decimal size both big enough, warning if new has fewer decimal digits, error if not all data fits | Error | Error | Error |
| RDM_COL DATE | Error | Error | Error | Error | Error | OK | Error | Error |
| RDM_COL TIME | Error | Error | Error | Error | Error | Error | OK | OK |
| RDM_COL DATETIME | Error | Error | Error | Error | Error | Warning | Warning | OK |

FIG. 15

SYSTEM FOR MIGRATING APPLICATION DATA DEFINITION CATALOG CHANGES TO THE SYSTEM LEVEL DATA DEFINITION CATALOG IN A DATABASE

BACKGROUND OF THE INVENTION

1. Field of the Invention

This invention relates to the field of data and data definition manipulation in a database.

2. Background Art

Database management systems (DBMS) have been developed to address informational needs by providing tools to define the structure of data, and to store and retrieve data. For example, a DBMS provides the ability to structure information into relations, or tables, and to relate tables using key fields.

The structure of the information can be defined using a data definition language. For example, a CREATEABLE statement can be used to create a table, name a table, identify the columns in the table, and identify information about each column (e.g., data type, default value, and nullability). Similarly, an ALTER command can be used to alter the table definition specified by the CREATETABLE statement.

The data definition language requires considerable expertise to use. A table creation operation is expressed using a syntax that must be correct before the creation operation can be performed. Similarly, an alteration operation requires a statement that must be expressed using the correct syntax.

In addition, an alteration operation requires additional steps to preserve the integrity of the data in the table. For example, an alteration that involves a conversion from one field to a second field that is shorter in length can result in an inability to retain all of the data contained in the field. Thus, to preserve the integrity of the data, the contents of a table must be examined prior to performing an alteration, and the data converted into the new data type.

The facilities of a DBMS are used to store a data definition. A table creation results in the creation of the table, and the inclusion of the data definition in DBMS control tables. Thus, when an alteration operation is performed, the information in the DBMS control tables must also be updated.

Prior art systems that use the capabilities of a DBMS to maintain data (i.e., DBMS application software) can require additional information about a field. Thus, it is desirable to provide the ability to maintain application control tables that contain the information from the DBMS control tables as well as additional information that further defines the application data. For example, a field's (or column's) data type may be stored in the DBMS and application control tables. Therefore, when an alteration operation is specified to alter a field's data type, both the DBMS and application control tables must be altered. Further, each DBMS has different methods for altering SQL tables. Thus, the alteration operation can vary depending on the method of altering SQL tables.

SUMMARY OF THE INVENTION

The present invention provides the ability to alter data definitions in a Database Management System (DBMS). The present invention provides the ability to maintain DBMS and application catalogs. Alterations can be made to an application catalog, and the changes propagated to the DBMS catalog based on the differences between like information in the application and DBMS catalogs as identified by the present invention.

The present invention provides the ability to test for data loss. That is, the present invention examines the requested alteration and the data that will be affected by the alteration to determine whether or not the alteration will result in the loss of data. If loss of data is possible, alerts can be generated to determine whether or not to proceed with the alterations.

The present invention provides two techniques to perform the alterations depending on the ability of the DBMS to perform an alter on the original table without using an intermediate table (i.e., a native alter), or performing the alterations using an intermediate table for a DBMS with limited native alter capabilities.

BRIEF DESCRIPTION OF THE DRAWINGS

FIG. 2 illustrates an AbsenceHist table prior to alteration.

FIG. 3 illustrates an AbsenceHist table after alteration.

FIGS. 9A(1) and 9A(2) provide examples of an Alter process.

FIGS. 9C(1) and 9C(2) provide examples a NativeAlter process flow.

FIGS. 12B(1) and 12B(2) provide process flow for Conversions.

FIG. 15 provides a set of conversion rules in tabular form.

DETAILED DESCRIPTION OF THE INVENTION

A method and apparatus for altering information in a database management system (DBMS). In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

DATABASE OVERVIEW

Figure 1:
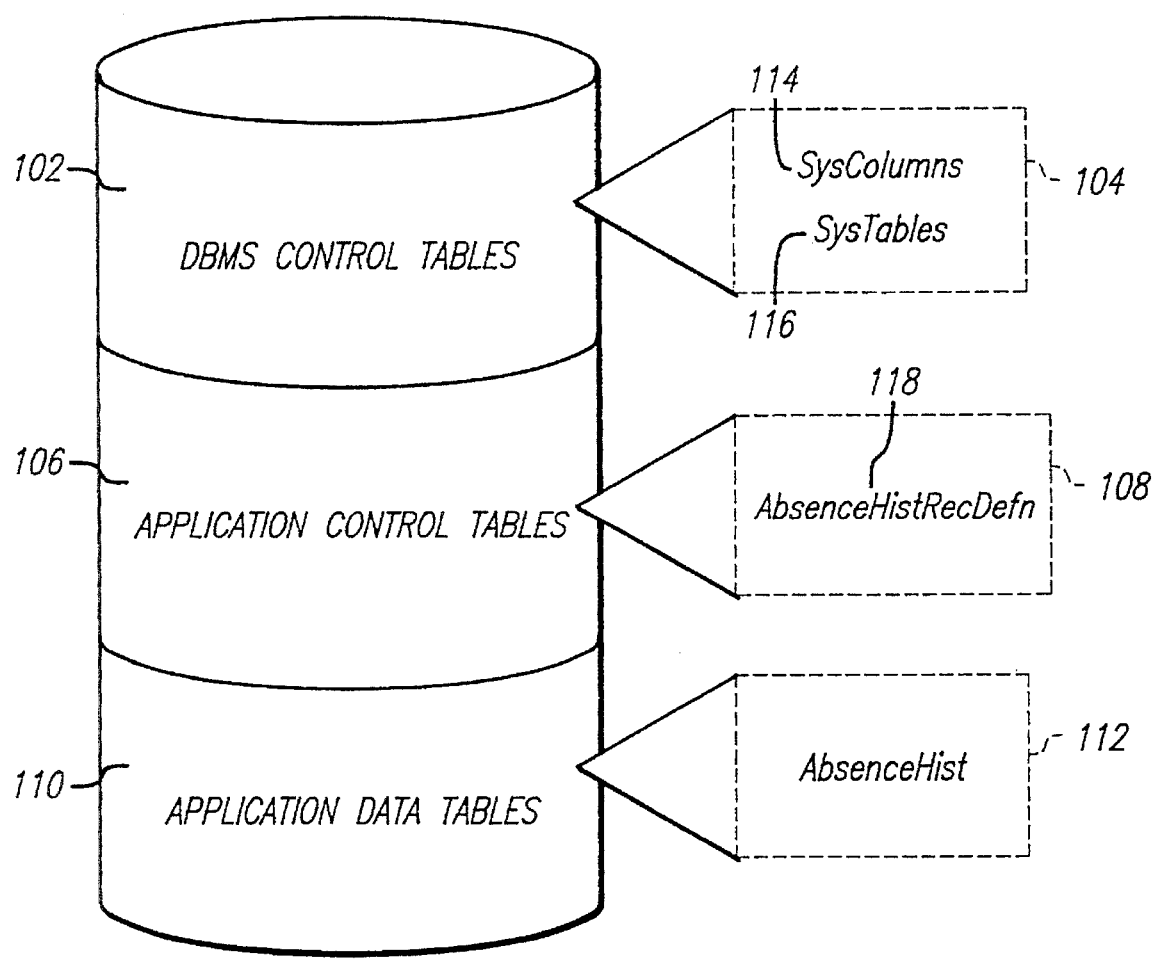
FIG. 1 provides an overview of the DBMS and application control and data tables.

In the present invention, a DBMS and the applications that use the DBMS store at least two types of information. FIG. 1 provides an example of these two types of data using relations such as are used in an RDBMS. The first type is the actual data for which the DBMS and application are designed to store and retrieve such as employee, finance, accounting, and manufacturing data. This data is stored in application data tables 110.

The second type of data is the control information. This data provides information about the structure of the application data. DBMS Control Tables 102 and Application Control Tables 106 include catalogs (i.e., control tables) that identify the existing tables. For example, SysTables 116 includes a record for each table and the number of columns in the table. A second control table may contain information about each field contained in each table. For example, SysColumns 114 and AbsenceHistRecDefn 118 contain field information.

Figure 5:
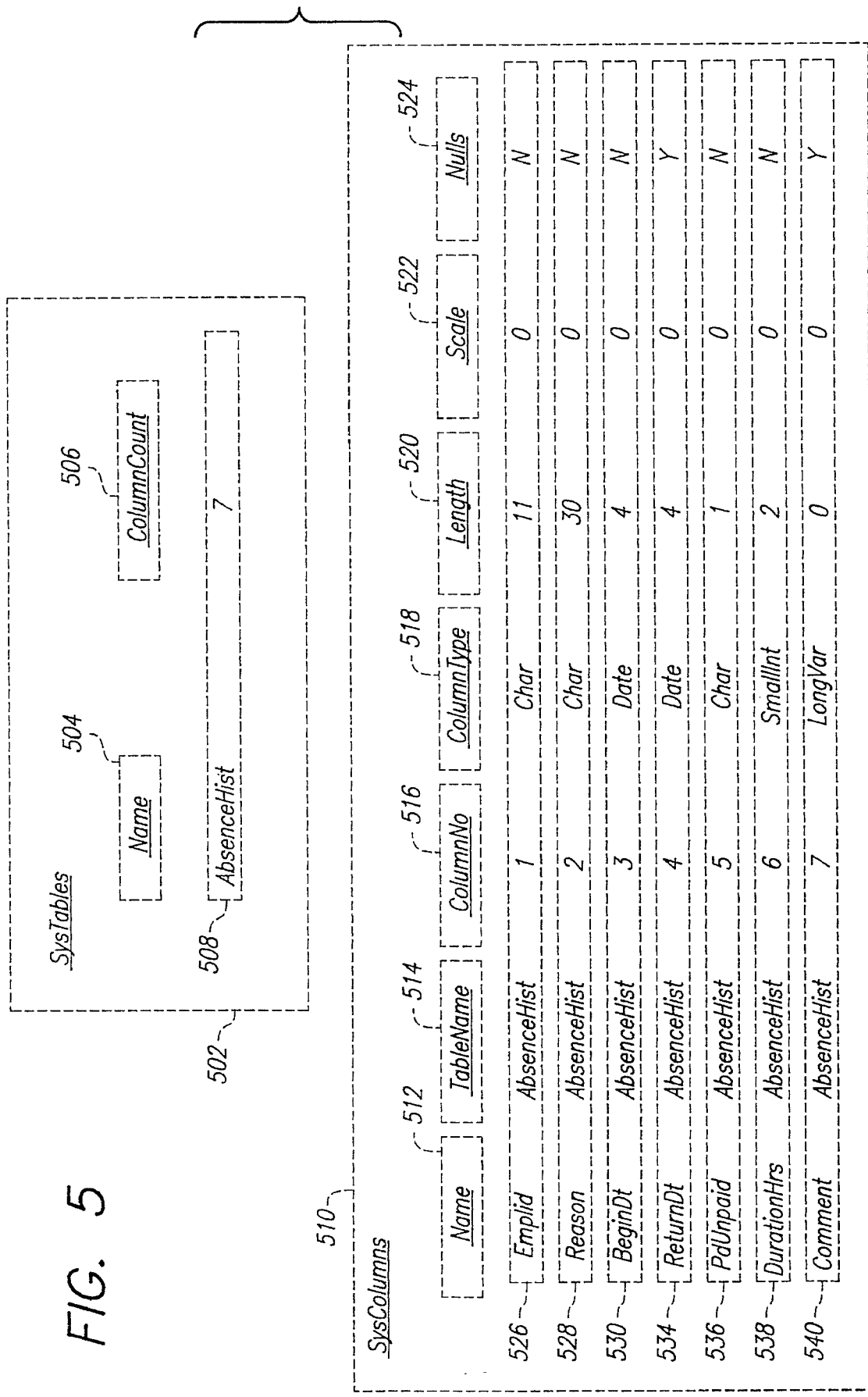
FIG. 5 provides an example of a DBMS catalog.

FIG. 5 provides further details of these two tables. SysTables 502 identifies the number of columns in each table. For example, record 508 indicates that an AbsenceHist table contains seven columns. SysColumns 510 provides information about the columns in a table. Name field 512 contains the name of the column. TableName field 514 contains the name of the column's table. ColumnNo 516 indicates the position of the column relative to the other columns in the same table.

ColumnType 518 specifies the data type of the column's data. Length 520 specifies the length of the column. Scale 522 identifies the column's scale (e.g., the number of digits to the right of a decimal point for decimal types). Nulls 524 indicates whether a null value is a valid value for the column.

Entries 526-540 identify the seven columns of the AbsenceHist table identified in SysTables 502 (i.e., see record 508). For example, fields 512, 514, and 516 indicate that record 538 defines the attributes of the seventh column (DurationHrs) of the AbsenceHist table. Fields 518, 520, 522, and 524 indicate that DurationHrs is a small integer data type of length two with a zero scale and no nulls.

The application control tables can supplement the DBMS Control Tables by providing additional information to support features provided by the application and not by the DBMS. For example, an application control table may contain a field that specifies the format of the contents of a data table field can be entered in uppercase, lowercase, or mixed (i.e., both upper and lowercase). Thus, the contents of that field can be edited to conform to the format specification.

Figure 4A:
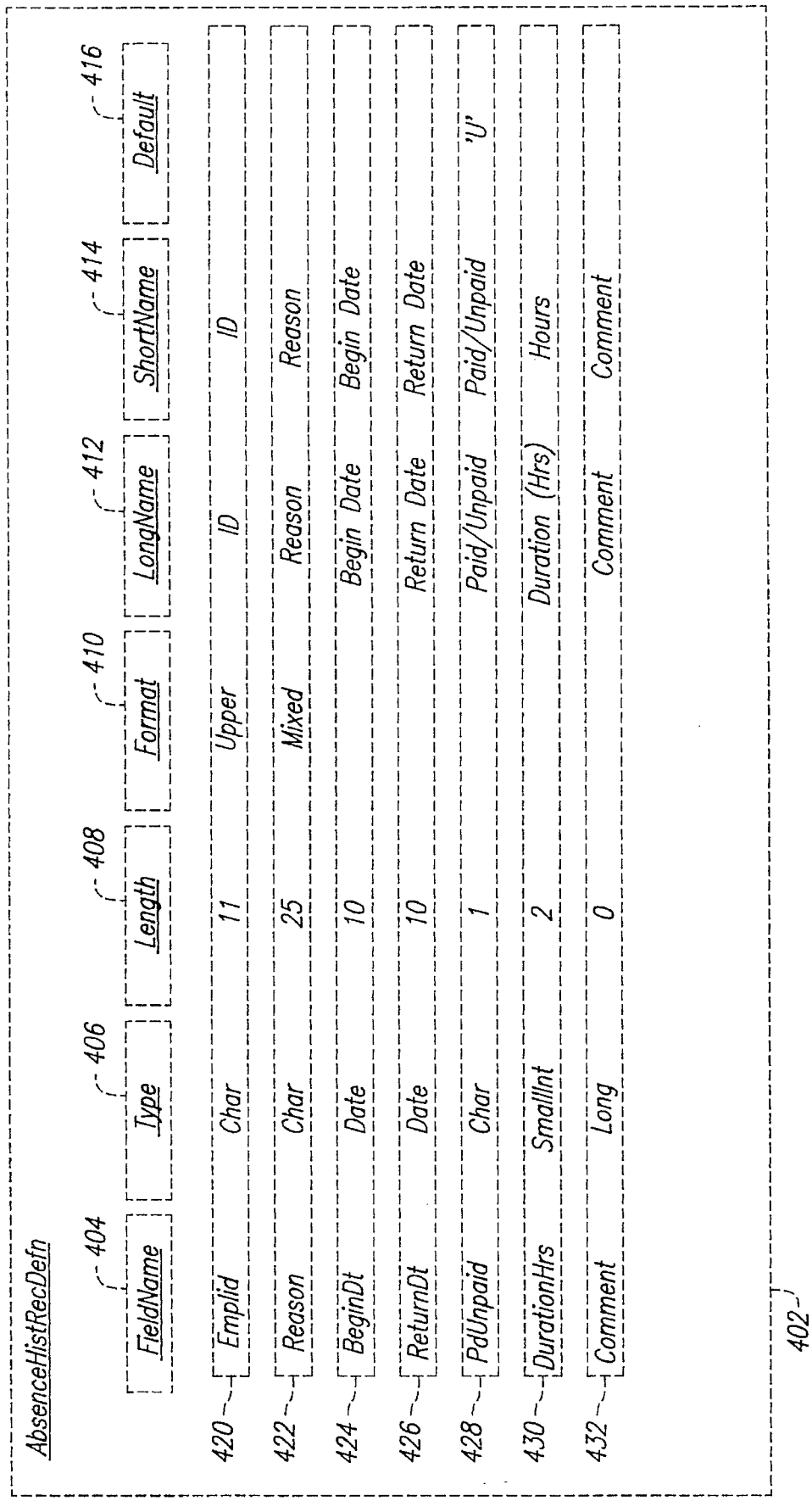
FIG. 4A illustrates an application control table definition for the AbsenceHist table.

FIG. 4A illustrates an application control table definition for the AbsenceHist table. In addition to the control table information from SysColumns 510 (FIG. 5), AbsenceHistRecDefn 402 contains Format 410, LongName 412, ShortName 414, and Default 416 fields.

ALTERATIONS OVERVIEW

The present invention provides the ability to modify the application and DBMS tables based on the alterations identified by a user. For example, a user may want to alter AbsenceHist table 202 of FIG. 2. Referring to FIG. 4A, for example, the following changes can be made to the structure of AbsenceHist:

1. Type 406 for DurationHrs 430 changed from "SmallInt" to "Decimal", and Length 408 to "3.1";

2. Length 408 for Reason 422 changed from twenty-five to fifteen;

3. delete Comment 432; and 4. change FieldName 404 for PdUnpaid 428 from PdUnpaid to PdUnpd.

Figure 6:
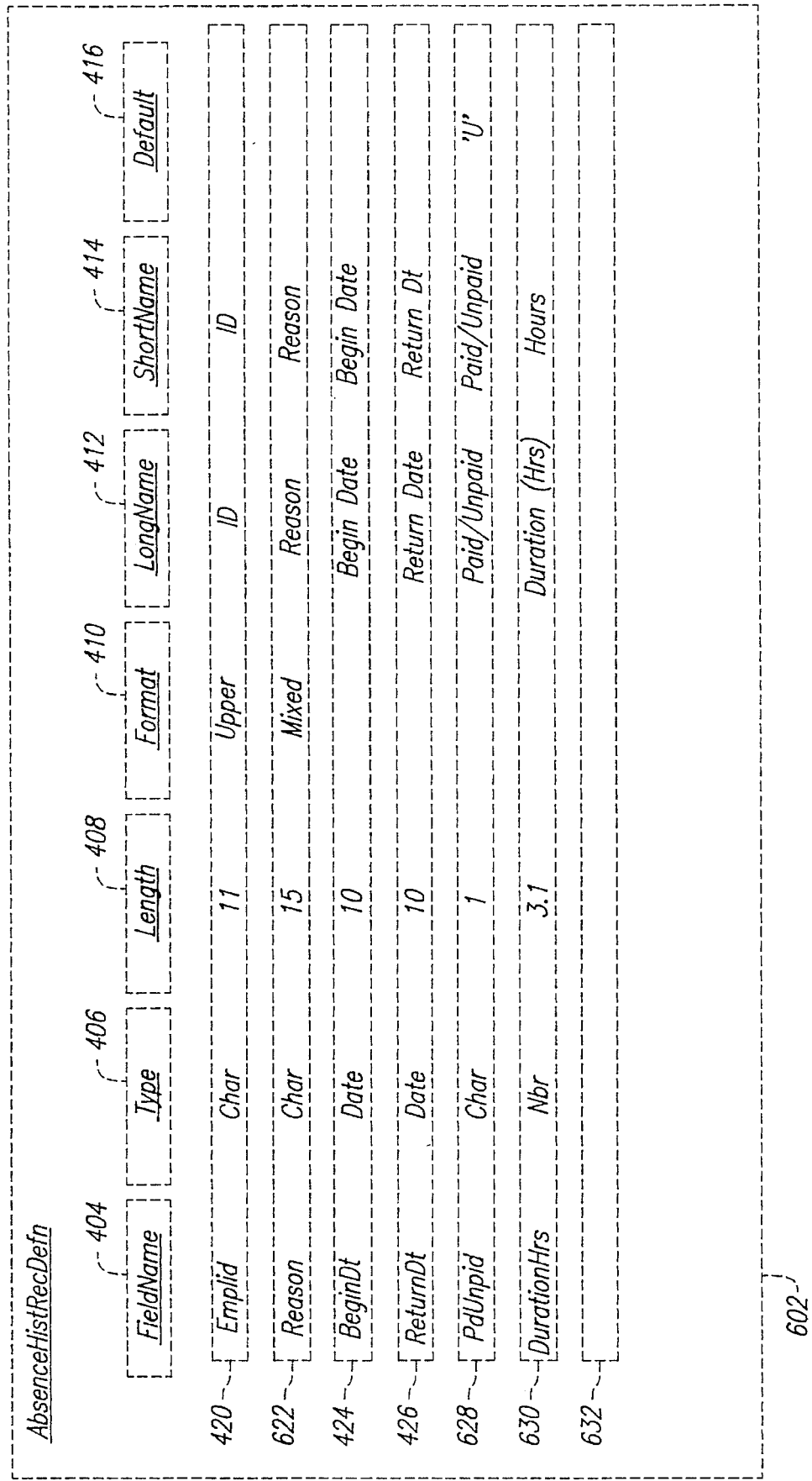
FIG. 6 illustrates AbsenceHistRecDefn after alterations are made to the application's catalog.

FIG. 6 illustrates AbsenceHistRecDefn 602 after these alterations are made to the application's catalog. Records 420, 424, and 426 are the same as in FIG. 4A. However records 422, 428, 430, and 432 of FIG. 4A are modified to become records 622, 628, 630, and 632, respectively. Length 408 for record 622 specifies a new length of fifteen. FieldName 404 for Record 628 indicates the new field name, PdUnpd. Length 408 for record 630 is changed to three decimal positions with a scale of one. Record 632 is blank to reflect the deletion of the comment field.

The alterations must further be made to the DBMS catalog to bring the DBMS catalog into conformity with the application catalog. Using the capabilities of the present invention, the differences between the application catalog and the DBMS catalog can be identified, and the DBMS catalog can then be updated.

Figure 7:
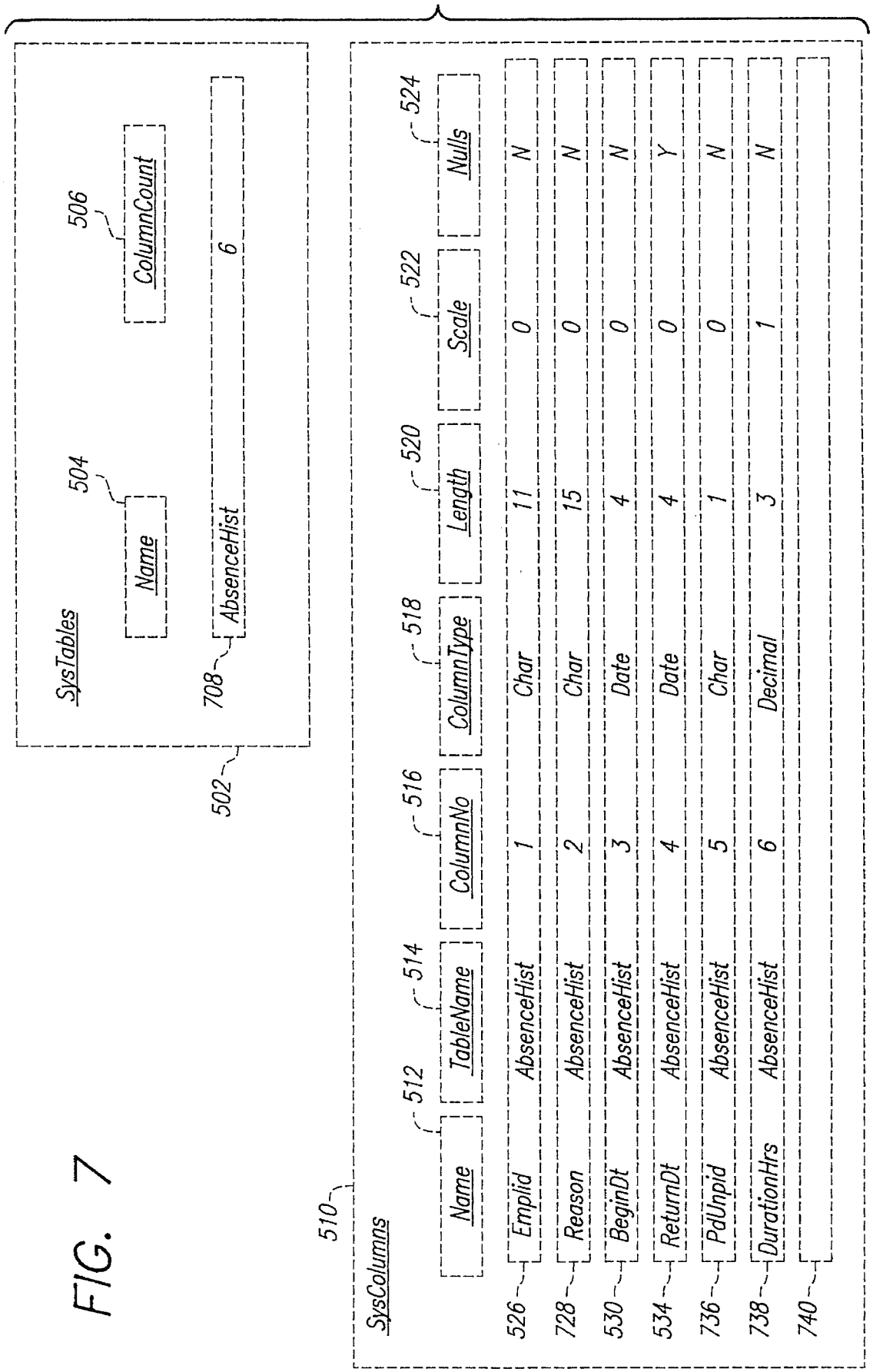
FIG. 7 illustrates the DBMS catalog after alterations.

FIG. 7 illustrates the DBMS catalog after the present invention makes the appropriate changes to the DBMS catalog. ColumnCount 506 in Record 708 of SysTables 502 is decremented by one to reflect the deletion of the comment field. Referring to SysColumns 510 in FIG. 7, records 526, 530, and 534 remain the same as in FIG. 5. Record 728 in FIG. 7 reflects a change to Length 520 (i.e., fifteen). Record 736 includes a change to Name 512 (i.e., PdUnpd). ColumnType 518, Length 520 and Scale 522 in record 738 reflect a the change to decimal (i.e., 3.1). Record 740 illustrates the deletion of the Comments field.

FIG. 3 illustrates the AbsenceHist data table after the present invention performs the alterations and conversions. Columns 204, 306, 208, 210, 312, 314, and 316 are the fields of AbsenceHist 202. Records 320–326 are the data records in AbsenceHist 202. Record 322 illustrates the change made to DurationHrs 214. The small integer data type was changed to decimal number with three digits and one digit scale. Thus the value "4.5" can now be stored in DurationHrs 314. Further, field 316 no longer exists to reflect the deletion of the comments field. Field 312 is referenced using the new name for that field, "PdUnpd" (i.e., original name was PdUnpaid). The reduction in the length of Reason field 306 from twenty-five to fifteen did not result in any character truncation, and thus, shows no visible change.

Figure 8:
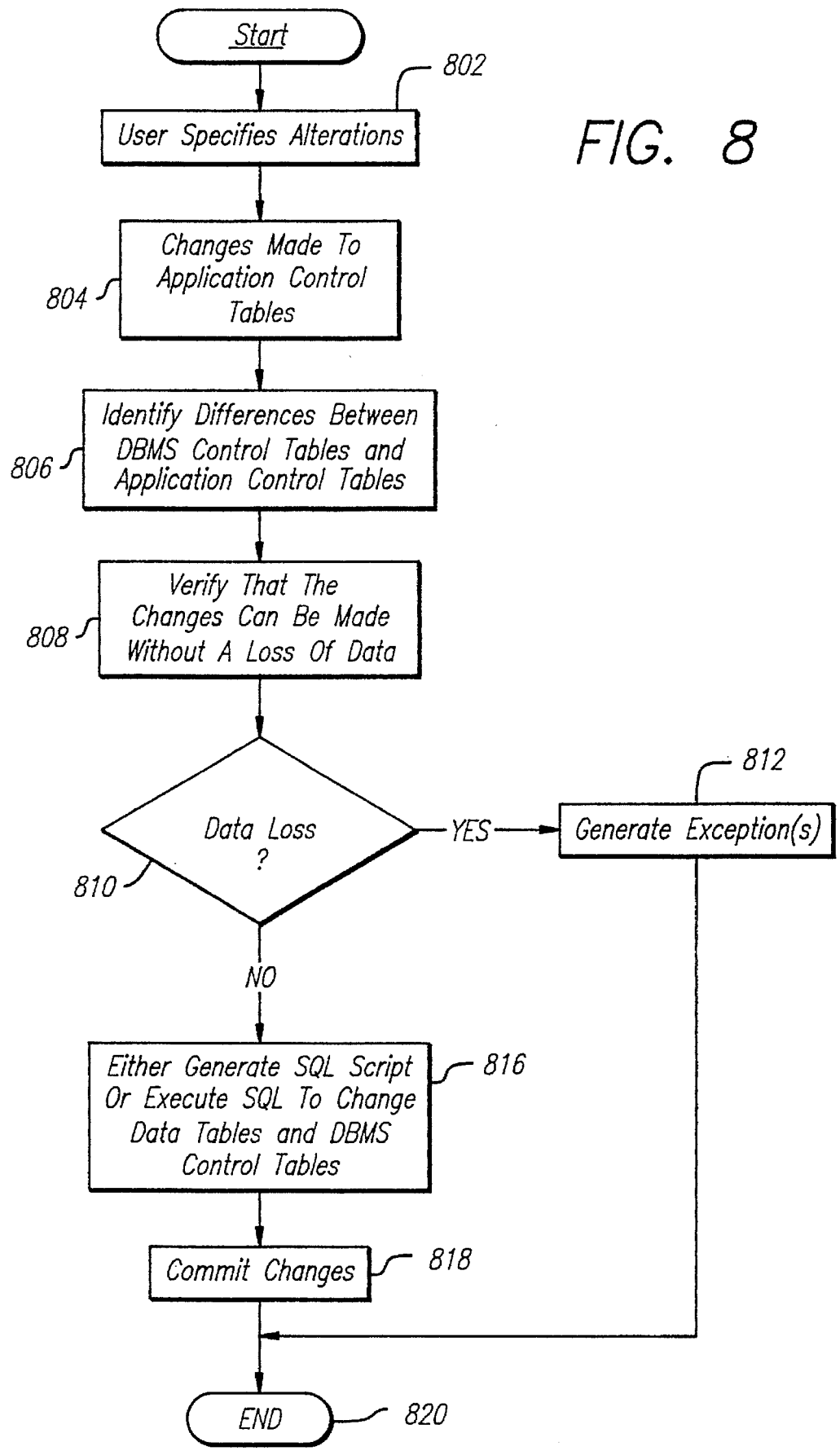
FIG. 8 provides an overview of the alteration process.

FIG. 8 provides an overview of the alteration process. At block 802, the user specifies the alteration to be performed. The alterations are made to the application's control tables (e.g., AbsenceHistRecDefn 402) at block 804. The differences between the DBMS control tables and the application control tables are identified at block 806. A verification that the changes can be made without a loss of data is performed at block 808. If, at decision block 810 (i.e. "data loss?"), the changes cannot be made without data loss, exceptions are generated at 812, and processing ends at 820. If, at decision block 810, the changes can be made without data loss, the script necessary to change the data and DBMS tables is generated or the SQL is executed at 816. The changes are committed at 818, and processing ends at 820.

ALTER PROCESS FLOW

FIGS. 9A(1) and 9A(2) provide examples of an Alter process. At block 902, an alter record definition is initialized. At block 904, CreateAlterRecDefn is invoked to create the alter record definition. At decision block 906 (i.e., "any changes to record definition?"), if there are no changes to the record definition, alter processing ends at block 926.

If, at decision block 906, it is determined that there are changes, processing continues at decision block 908. At decision block 908 (i.e., "all fields processed?"), if all altered fields have not been tested for data loss, processing continues at processing block 910 to get the next field. At block 912, TestForDataLoss is invoked to determine whether data loss can occur from the alteration.

When it is determined at decision block 908 (i.e., "all fields processed?") that all of the fields are processed, processing continues at decision block 914. At decision block 914 (i.e., "loss of data?"), if data loss occurs from the alterations, processing continues at decision block 922.

If, at decision block 914, no data loss occurs from the alterations, processing continues at block 916 to get create options information for tables and table indices. At processing block 918, default values are assigned to new fields. At decision block 920 (i.e., "DBMS has native alter capabilities?"), if the DBMS has native alter capabilities, processing continues at block 922 to invoke NativeAlter. If it is determined at decision block 920 that the DBMS does not have native alter capabilities, processing continues at block 924 to invoke EmulateAlter. In both cases, processing continues at processing block 926 to invoke CreateIndexes.

At decision block 922 (i.e., "successful completion?") if the alteration operation(s) were successfully completed, processing continues at block 926 to commit the alter transaction(s). If the alteration operation(s) did not end in success, processing continues at block 924 to rollback the alter transaction(s). In both cases, processing ends at block 926.

CreateAlterRecDefn

Figure 10A:
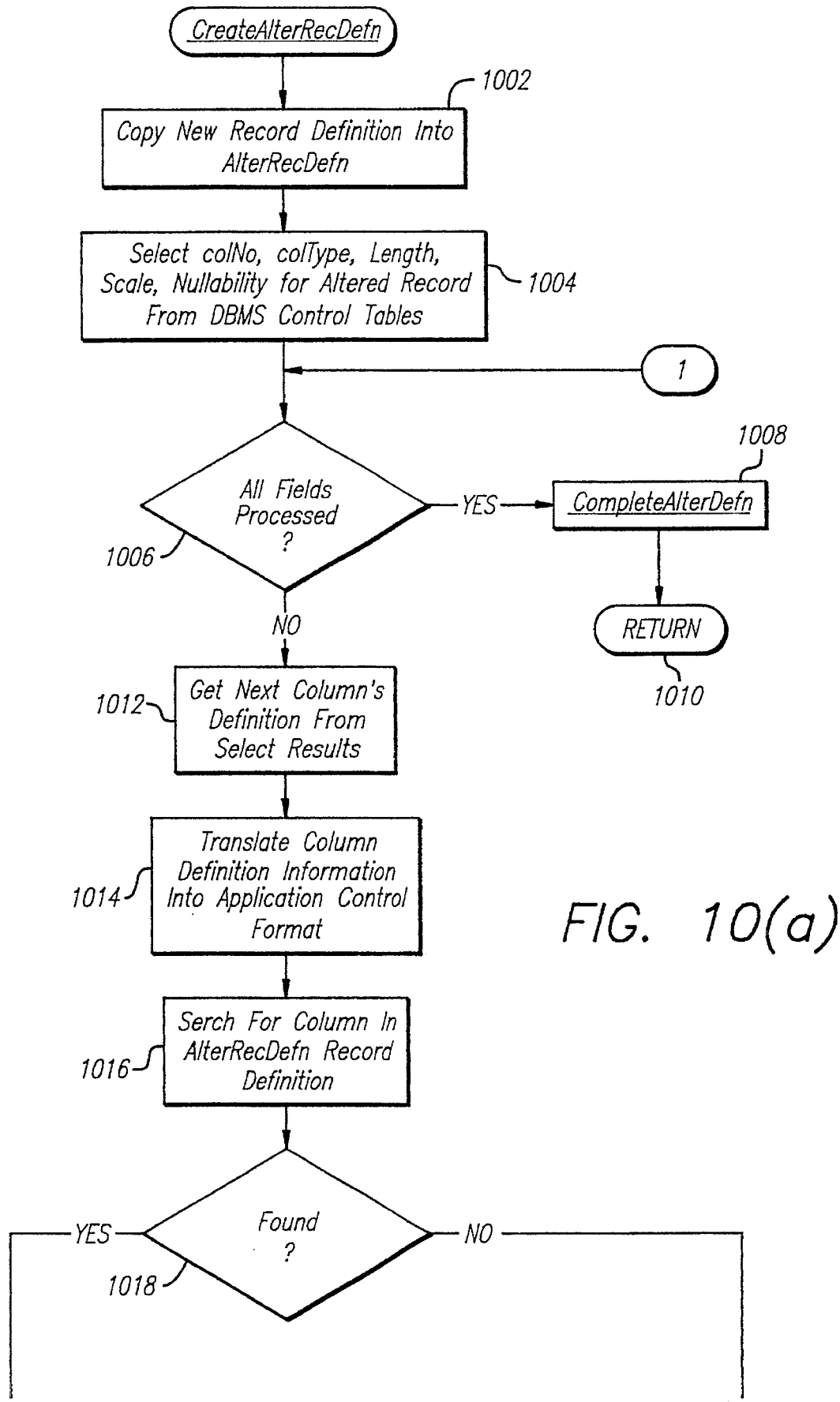
FIGS. 10(a), 10(b), and 10(c) provide process flow for CreateAlterRecDefn.
Figure 10B:
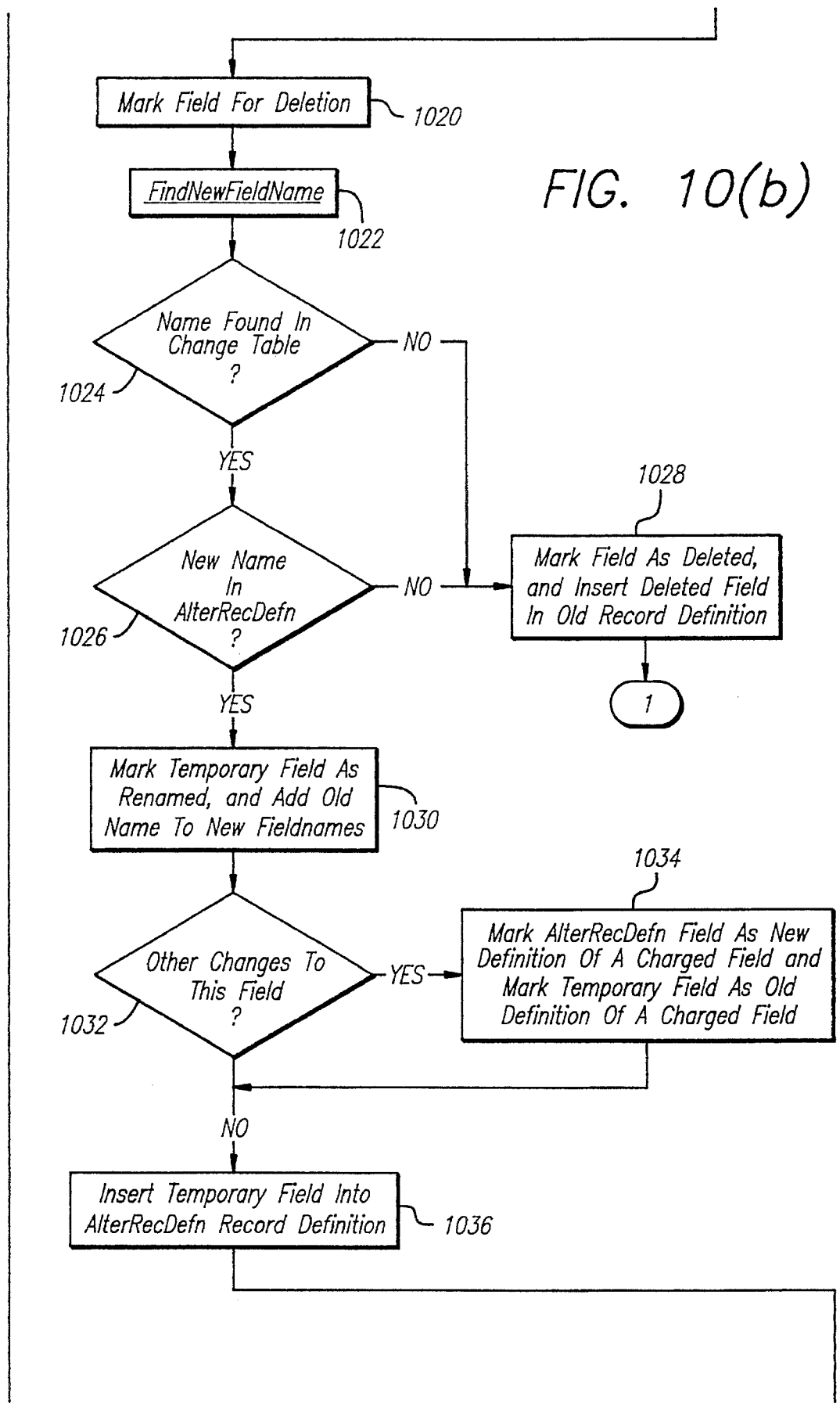
Figure 10C:
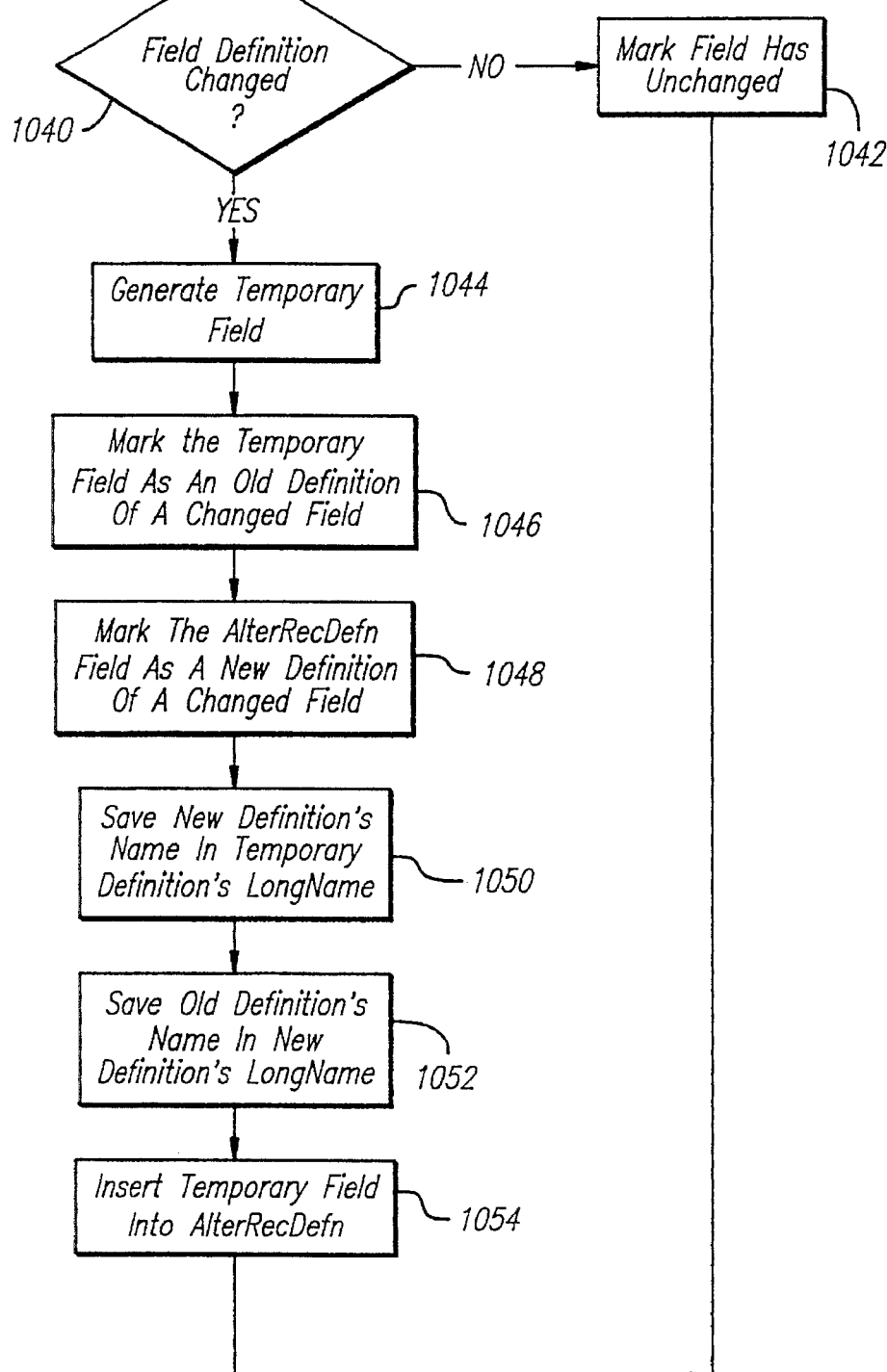

Alter invokes CreateAlterRecDefn to build a temporary record definition to hold the old (i.e., record definition without the alterations) record definition. After defining the fields in the temporary record, the record is added to the intermediate record definition. The intermediate record definition is retained in either a temporary (i.e., for alter emulations) or the original (i.e., for native alters) record definitions. FIGS. 10(a), 10(b), and 10(c) provide process flow for CreateAlterRecDefn.

At processing block 1002, the new record definition is copied into AlterRecDefn. At processing block 1004, the old record definition (e.g., column number, column type, length, scale, and nullability) is obtained from the DBMS control tables. At decision block 1006 (i.e., "all fields processed?"), if all of the fields have been processed, processing continues at block 1008 to invoke CompleteAlterDefn, and returns at block 1010.

If, at decision block 1006, all of the fields have not been processed, processing continues at block 1012. At block 1012, the next column's old definition is obtained from the DBMS. If necessary, the DBMS column definition information is translated into application control format at processing block 1014. At block 1016, AlterRecDefn is searched to find the column name obtained from the DBMS.

At decision block 1018 (i.e., "found?"), if the column name is not found in AlterRecDefn, processing continues at processing block 1020 to mark the field for deletion. At processing block 1022, FindNewFieldName is invoked to search a change table for the DBMS column name. If the column name is found, a rename alteration operation is assumed, and the new name is obtained from the change table.

At decision block 1024 (i.e., "name found in change table?"), if the old name is found in the change table, processing continues at decision block 1026. At decision block 1026 (i.e., "new name in AlterRecDefn?"), if the new name is found in the AlterRecDefn processing continues at block 1030.

At decision blocks 1024 or 1026, the old name is not found or the new name is not in the AlterRecDefn, processing continues at block 1028 to mark the field as deleted, and insert the deleted field in the old record definition. Processing continues at decision block 1006 to process any remaining fields at decision block 1006 to process any remaining fields.

At processing block 1030, a temporary field is created for the old record definition and the field is marked as renamed. The old name is added to the LongName field of the record in AlterRecDefn. At decision block 1032 (i.e., "other changes to this field?"), if there are additional alterations to the renamed field, processing continues at block 1034 to mark the AlterRecDefn as a new definition of a changed field and the temporary field as the old definition of a changed field. Processing continues at block 1036

If, at decision block 1032, if no other changes were made to the renamed field, processing continues at block 1036. At processing block 1036, the temporary field is added to the AlterRecDefn. Processing continues at decision block 1006 to process any remaining fields.

If, at decision block 1018 (i.e., "found?"), the column name is found in AlterRecDefn, processing continues at decision block 1040. At decision block 1040 (i.e., "field definition changed?"), if the field definition has not changed, processing continues at block 1042 to mark the field as unchanged and processing continues at decision block 1006 to process any remaining fields.

If, at decision block 1040, the field definition has changed, processing continues at block 1044 to generate a temporary field. At processing block 1046, the temporary field is marked as an old definition of a changed field. At block 1048, the field in AlterRecDefn is marked as a new definition of a changed field.

At processing block 1050, the name of the new definition is saved in the temporary definition. At processing block 1052, the name of the old definition is stored in the new definition. At processing block 1054, the temporary field is inserted into AlterRecDefn. Processing continues at decision block 1006 to process remaining fields.

CompleteAlterDefn

Figure 14:
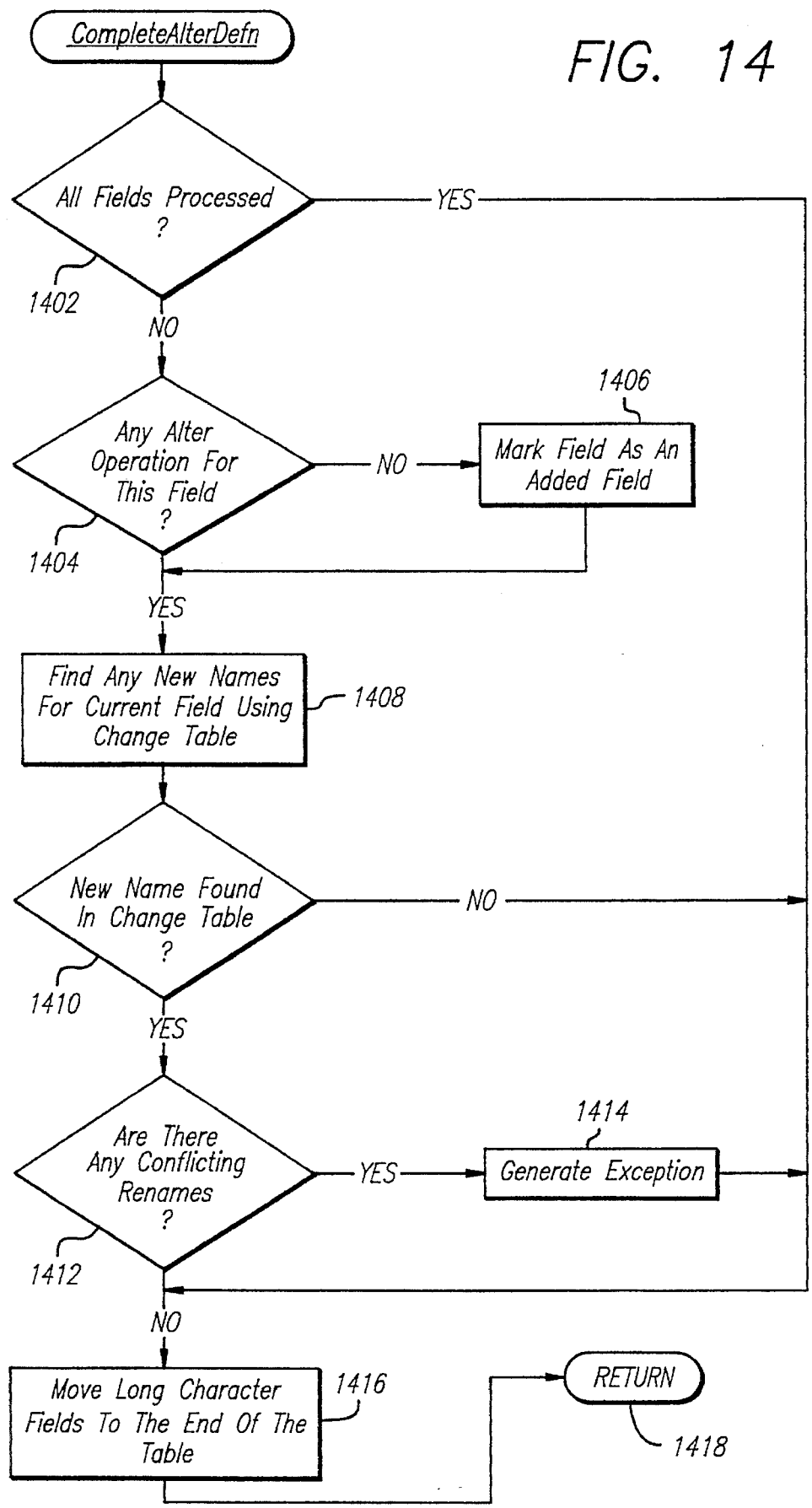
FIG. 14 illustrates a process flow for CompleteAlterDefn.

CompleteAlterDefn is invoked to complete the settings in AlterRecDefn. FIG. 14 illustrates a process flow for CompleteAlterDefn. At decision block 1402 (i.e., "all fields processed?"), if all of the fields have been processed, processing continues at processing block 1416.

If, at decision block 1402, all fields have not been processed, processing continues at decision block 1404. At decision block 1404 (i.e., "any alter operations for this field?"), if no alter operations exist for this field, the field is marked as an added field at processing block 1406. Processing continues at block 1408. If, at decision block 1402, other alter operations exist for the field, processing continues at block 1408.

At processing block 1408, the change table is used to find any new name for the current field. At decision block 1410 (i.e., "new name found in change table?"), if a new name is not found in the change table, processing continues at block 1416. If, at decision block 1410, a new name is found in the change table, processing continues at decision block 1412.

At decision block 1412 (i.e., "are there any conflicting renames?"), if a conflicting rename is detected, processing continues at block 1414 to generate an exception, and processing continues at block 1416.

If, at decision block 1412, no conflicting renames exist, processing continues at block 1416. At processing block 1416, any long character fields are moved to the end of the table. Processing returns at block 1418.

FindNewFieldName

Figure 4B:
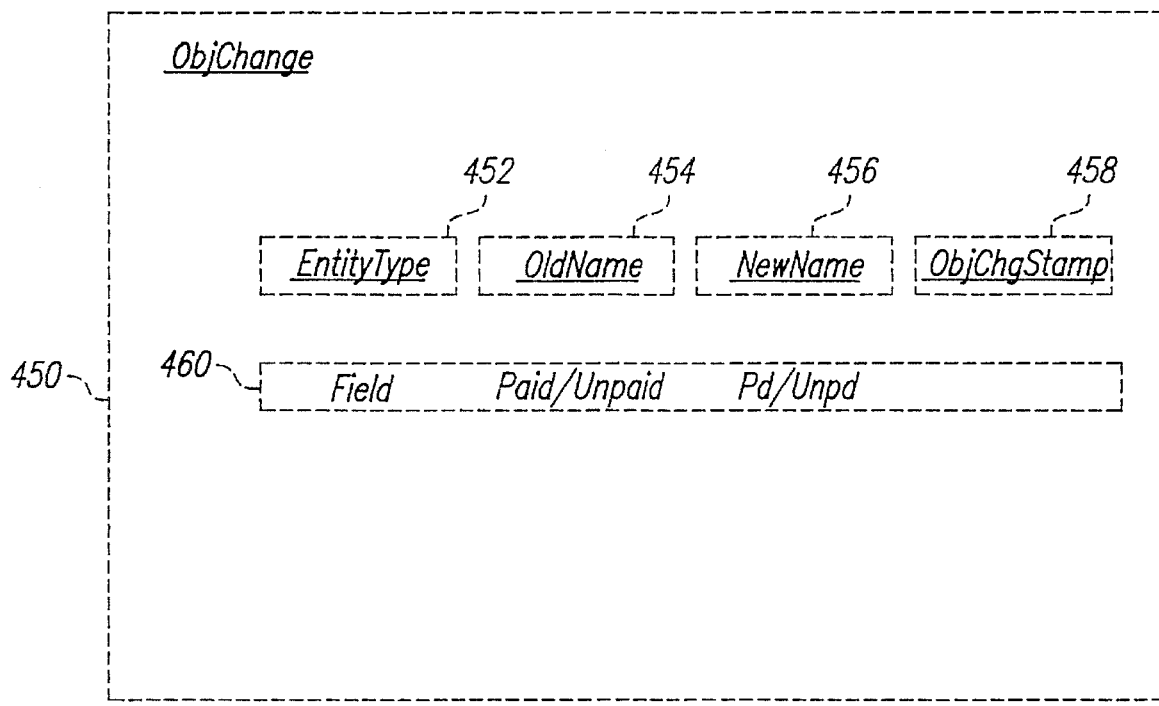
FIG. 4B illustrates a name change table

FindNewFieldName is used to search a change table that correlates new field names with old field names. FIG. 4B illustrates change table 450 that contains entityType 450, oldName 454, newName 456, and ObjChgStamp 458 fields to provide type, old name, new name and time stamp information for each entry. Record 460 illustrates an entry to indicate that field Paid/Unpaid was renamed to Pd/Unpd.

FindNewFieldName searches for the latest new name for the old name by tracing from the old name to the new name via intermediate names. If the new name is not detected using this search technique, the change table is searched for a subsequent rename. For example, name A is renamed to name B, and then A is renamed to C.

Figure 11:
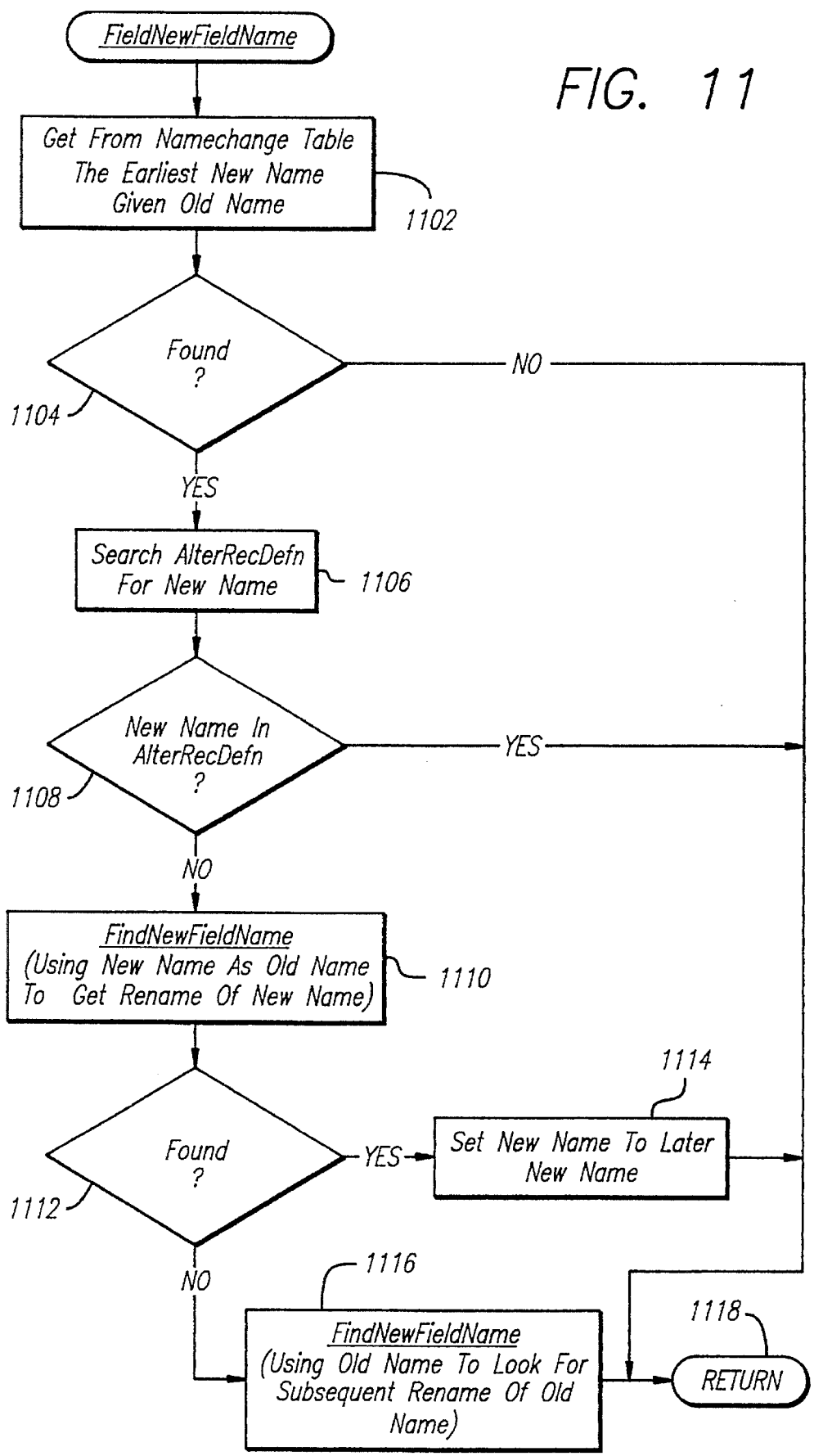
FIG. 11 illustrates a process flow for FindNewFieldName.

FIG. 11 illustrates a process flow for FindNewFieldName. At processing block 1102, the change table is searched for the earliest new name of old name. At decision block 1104 (i.e., "found?"), if a new name is not found, processing returns at 1118. If, a new name is found, processing continues at processing block 1106 to search AlterRecDefn to find the new name.

At decision block 1108 (i.e., "new name in AlterRecDefn?"), if the new name is not found in AlterRecDefn, processing returns at 1118. If the new name is found, processing continues at block 1110 to invoke FindNewFieldName using the new name as the old name to search for a rename of the new name (e.g., A->B->C).

At decision block 1112 (i.e., "found?"), if a rename of the new name is found, processing returns at block 1118. If a rename is not found, processing continues at block 1116 to invoke FindNewFieldName using the old name to look for a subsequent rename of an old name (e.g., A->B, A->C). Processing returns at block 1118.

TestForDataLoss

FIG. 15 provides a set of conversion rules in tabular form. These rules are illustrative, and any such table can be developed and used to implement the data loss examinations and data conversion capabilities of the present invention without exceeding the scope of the present invention.

Table 1502 has two axes to represent the old and new data types. The vertical axis 1504 contain the old data types (or formats). The horizontal axis 1506 contain new data types. The intersection of a horizontal and vertical entry contains information regarding the validity of converting data from the old type to the new type. For example, intersection 1510 represents a change from small integer to decimal. Intersection 1510 indicates that such a format change is valid, if there are enough integer positions.

Figure 13:
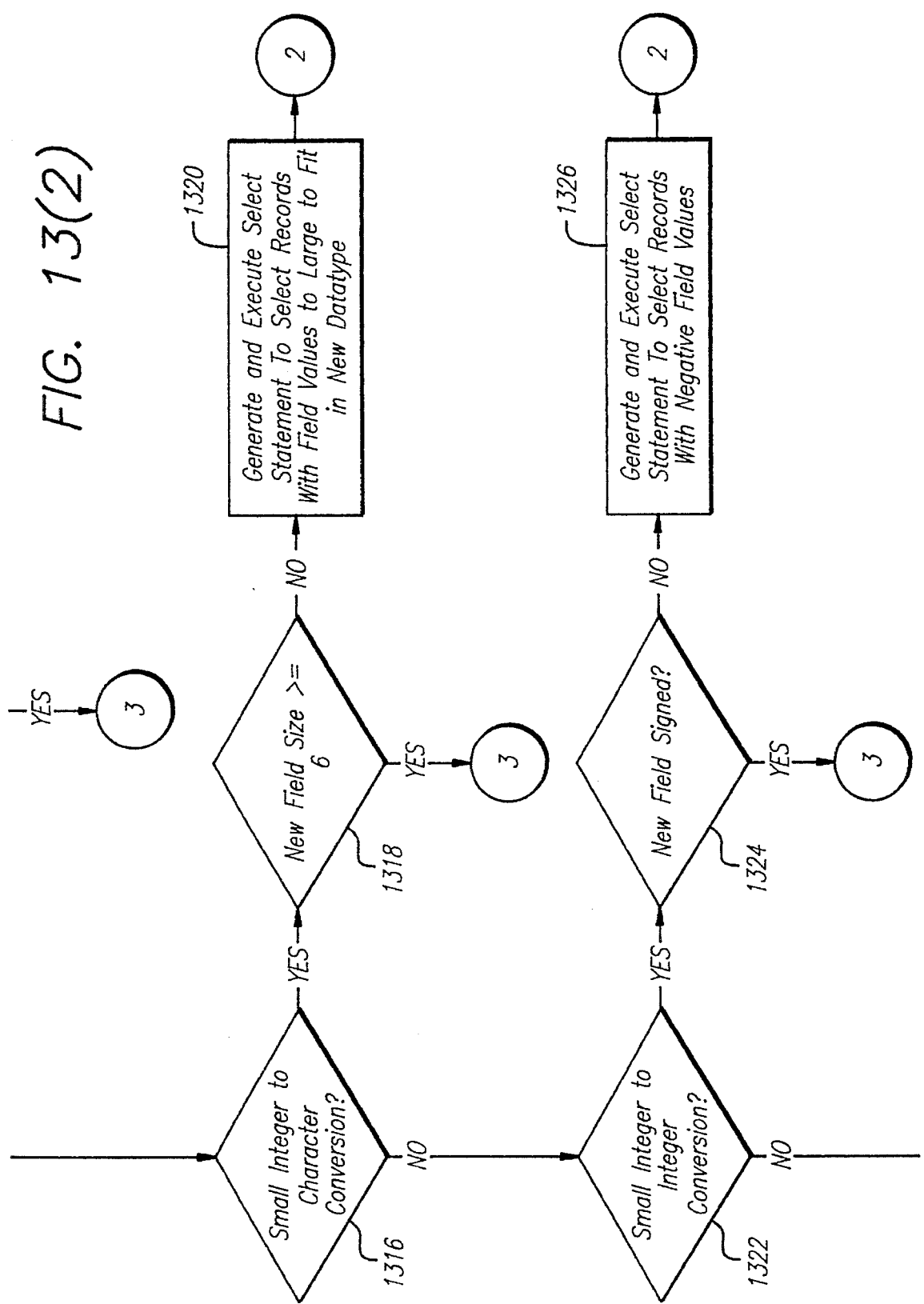
FIGS. 13(1), 13(2), 13(3), 13(4), and 13(5) provide process flow for TestForDataLoss.
Figure 13:
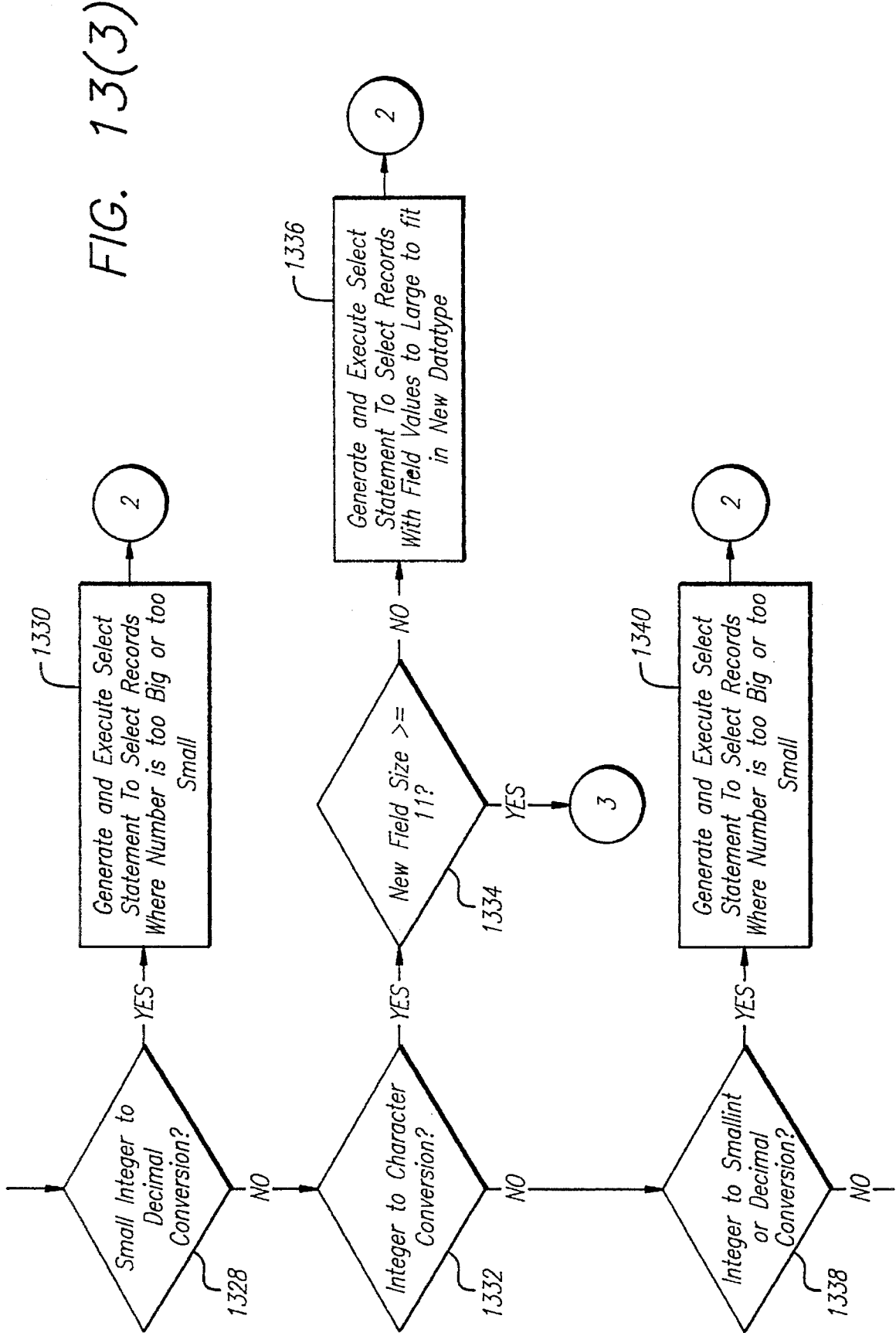
Figure 13:
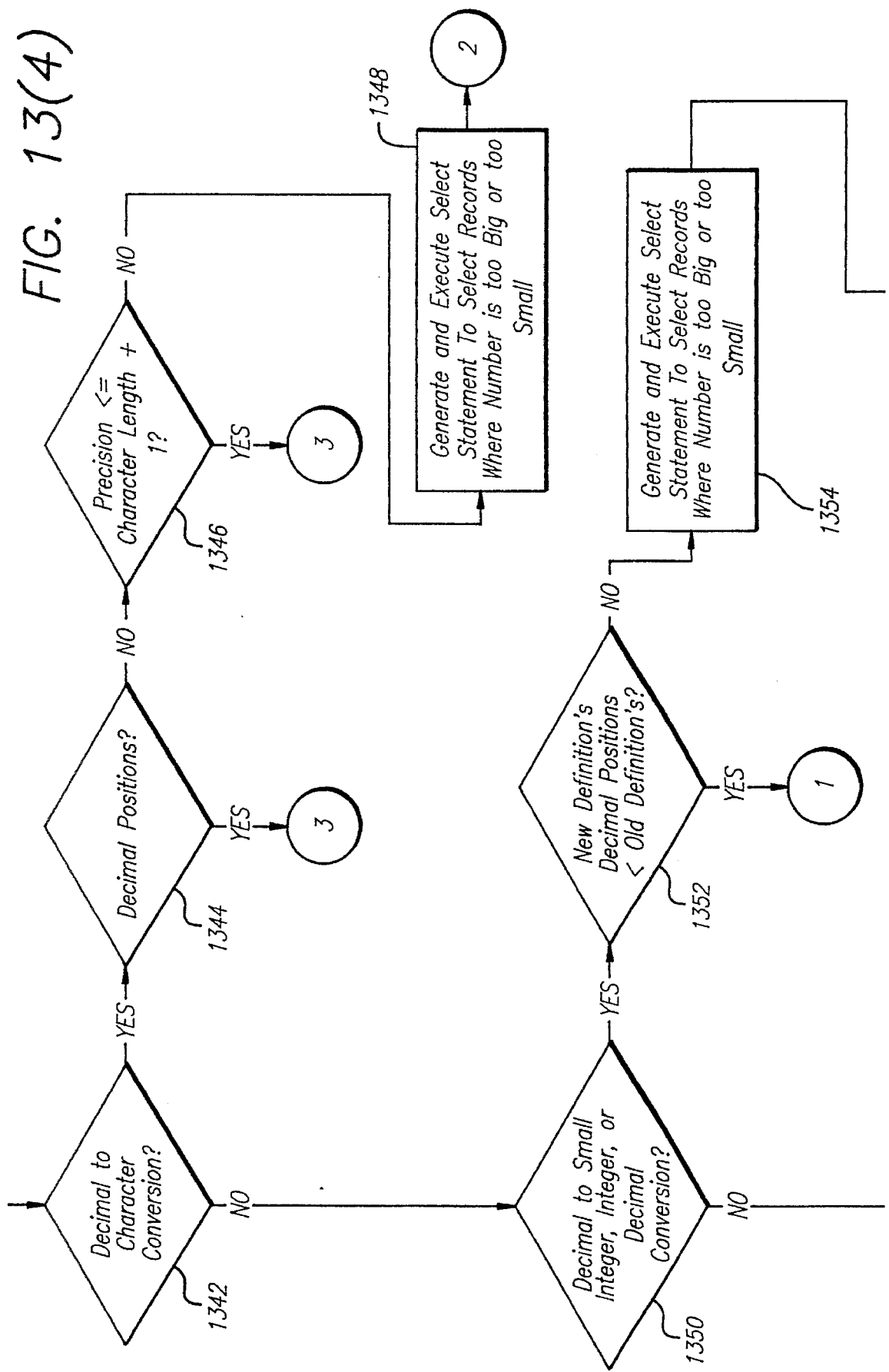
Figure 13:
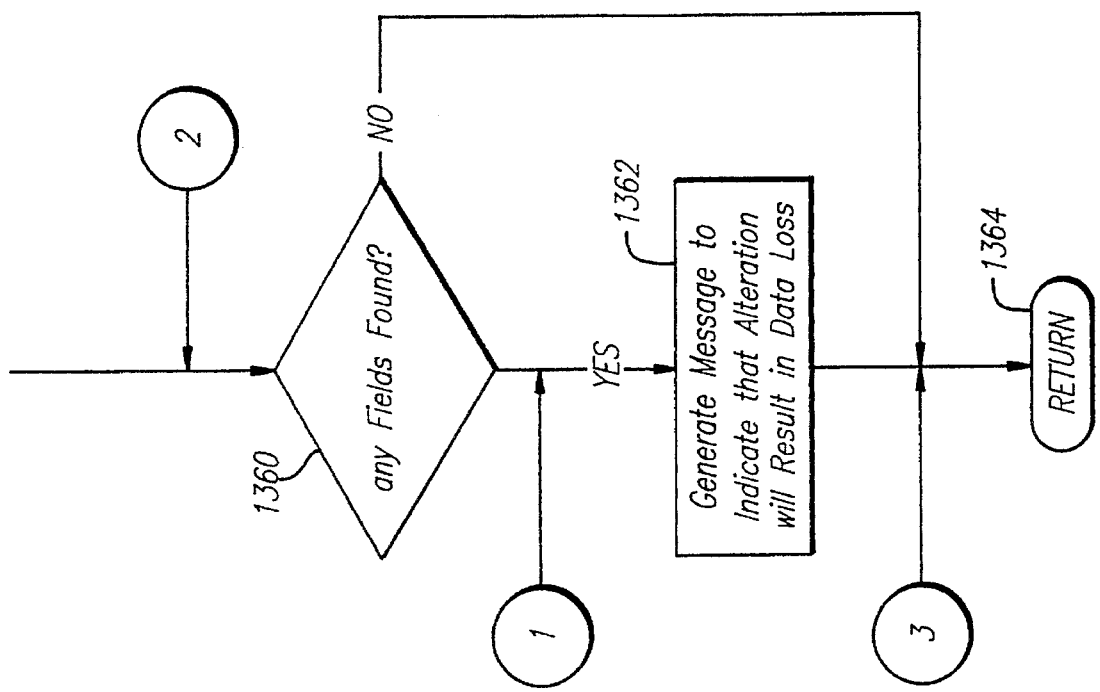
Figure 13:
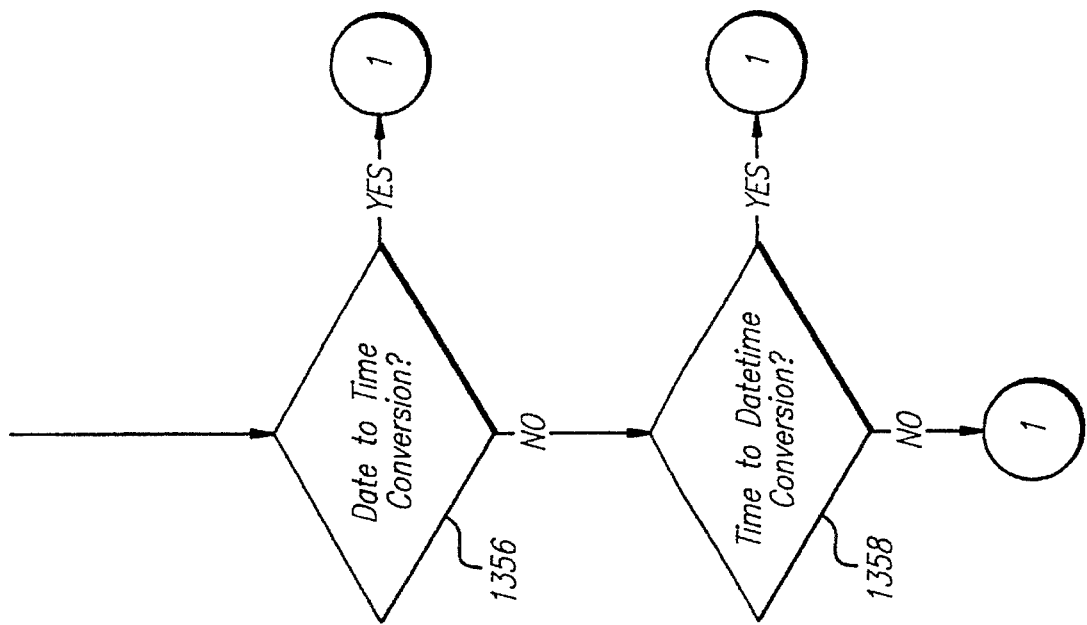

TestForDataLoss implements data conversion rules to determine whether or not an alteration is invalid or can result in the loss of data. FIGS. 13(1), 13(2), 13(3), 13(4), and 13(5) provide process flow for TestForDataLoss. At decision block 1302 (i.e., "unchanged field, new definition of changed field, added field, or renamed field unchanged?") if the field has not been changed, is a new definition of a changed field, an added field, or an unchanged, renamed field, processing returns at 1364.

If not, processing continues at decision block 1304. At decision block 1304 (i.e., "delete?"), if the field is marked for deletion, processing continues at decision block 1306. At processing block 1306, a statement is generated and executed to identify records with data in the field to be deleted. Processing continues at decision block 1360. If, at decision block 1306, data does exist in this field, processing continues at block 1362 to generate a message to the user to indicate that the delete alteration for this field will result in data loss. The user may elect to continue the delete, not delete the field, or abort the alter session. Processing returns at 1364.

If, at decision block 1304, the field is not marked for deletion, processing continues at decision block 1310. At decision block 1310 (i.e., "character to char or long char conversion?"), if a character field is to be converted to a character or long character field, processing continues at decision block 1312. At decision block 1312 (i.e., "old definition's length<=new definition's, or new definition is long char?"), if the new length is greater than or equal to the old length, processing returns at 1364.

If, at decision block 1312, the new length is shorter than the old length, processing continues at block 1314 to generate and execute a select statement to select records whose string contents are greater than the new string length. Processing continues at decision block 1360.

If, at decision block 1310, the conversion is not a character for a character or long character, processing continues at decision block 1316. At decision block 1316 (i.e., "small integer to character conversion?"), if the conversion is from small integer to character, processing continues at decision block 1318. At decision block 1318 (i.e., "new field size>=67"), if the field size is greater than or equal to six, processing returns at 1363. If not, processing continues at 1320 to generate and execute a select statement to select records with field values to large to fit in the new data type. Processing continues at decision block 1360.

If, at decision block 1316, the conversion type is not integer to character, processing continues at decision block 1322. At decision block 1322 (i.e., "smaller integer to integer conversion?"), if the conversion from small integer to integer, processing continues at 1324. At decision block 1324 (i.e., "new field signed?"), if the new field is not a signed integer field, processing returns at block 1364. If not, processing continues at block 1326 to generate and execute a statement to select records with negative field values. Processing continues at decision block 1360.

If, at decision block 1322, the conversion is not from small integer to integer, processing continues at decision block 1328. At decision block 1328 (i.e., "small integer to decimal conversion?"), if the conversion is from small integer to decimal, processing continues at block 1330 to generate and execute a statement to select records where the field contents are too big or too small for the new data type. Processing continues at decision block 1360.

If, at decision block 1328, the conversion is not from small integer to decimal, processing continues at decision block 1332. At decision block 1332 (i.e., "integer to character conversion?"), if the conversion is from integer to character, processing continues at decision block 1334. At decision block 1334 (i.e., "new field size>=11?"), if the new field size is greater than or equal to eleven, processing returns at block 1364.

If not, processing continues at block 1336 to generate and execute a select statement to select records with field values to large to fit in the new data type. Processing continues at decision block 1360.

If, at decision block 1332, the conversion is not of type integer to character, processing continues at decision block 1338. At decision block 1338 (i.e., "integer to smallint or decimal conversion?"), if a small integer data type is to be converted to decimal, processing continues at block 1340 to generate and execute a statement to select field where the numeric contents of the field are too big or too small. Processing continues at decision block 1360.

If, at decision block 1338, the conversion is not from small integer to decimal, processing continues at decision block 1342. At decision block 1342 (i.e., "decimal to character conversion?"), if the conversion is from decimal to character, processing continues at decision block 1344. At decision block 1344 (i.e., "decimal positions?"), processing continues at block 1362. If not, processing continues at decision block 1346. At decision block 1346 (i.e., "precision<=character length+1?"), if the character length is equal to the number of decimal places to the left of the decimal point plus one, processing returns at 1364. If not, processing continues at 1348 to generate and execute a statement to select records where the numeric contents are either too big or too small for the conversion. Processing continues at decision block 1360.

If, at decision block 1342, the conversion is not decimal to character, processing continues at decision block 1350. At decision block 1350 (i.e., "decimal to small integer, integer, or decimal conversion?"), if the conversion is from decimal to small integer, integer, or decimal, processing continues at decision block 1352. At decision block 1352 (i.e., "new definition's decimal positions<old definition's?"), if the number of decimal positions in the new definition is less than the number of old definition's decimal positions, processing continues at 1362. If not, processing continues at block 1354 to generate and execute a statement to select records where the numeric contents are either too big or too small. Processing continues at decision block 1360.

If, at decision block 1350, the conversion is not from decimal to small integer, integer, or decimal, processing continues at decision block 1356. At decision block 1356 (i.e., "date to time conversion?"), if the conversion is from date to time, processing continues at block 1364.

If, at decision block 1356, the conversion is not from date to time, processing continues at decision block 1358. At decision block 1358 (i.e., "time to datetime conversion?"), if the conversion is from time to datetime, processing continues at block 1362. If, at decision block 1358, the conversion is not from time to datetime, processing continues at block 1362.

At decision block 1360 (i.e., "any fields found?"), if any fields are found in the selection process, processing continues at block 1362 to generate a message to indicate that the alteration can result in data loss, and processing returns at block 1364. If, at decision block 1360, no fields are detected, processing returns at 1364.

Alter Emulation Method

When the DBMS does not provide an native alter capability (i.e., the ability to alter a table in place), an emulation method can be used to alter a table. The emulation method creates a temporary data table containing fields from both the old and new record definitions, copies the data to the temporary table, converts the data, deletes the original table, creates a new table using the original name and the new record definition, copies the data from the temporary table to the new table, and drops the temporary table. The alter emulation method works on standard SQL databases. The other alter methods depend on features of a particular DBMS.

Figure 9B:
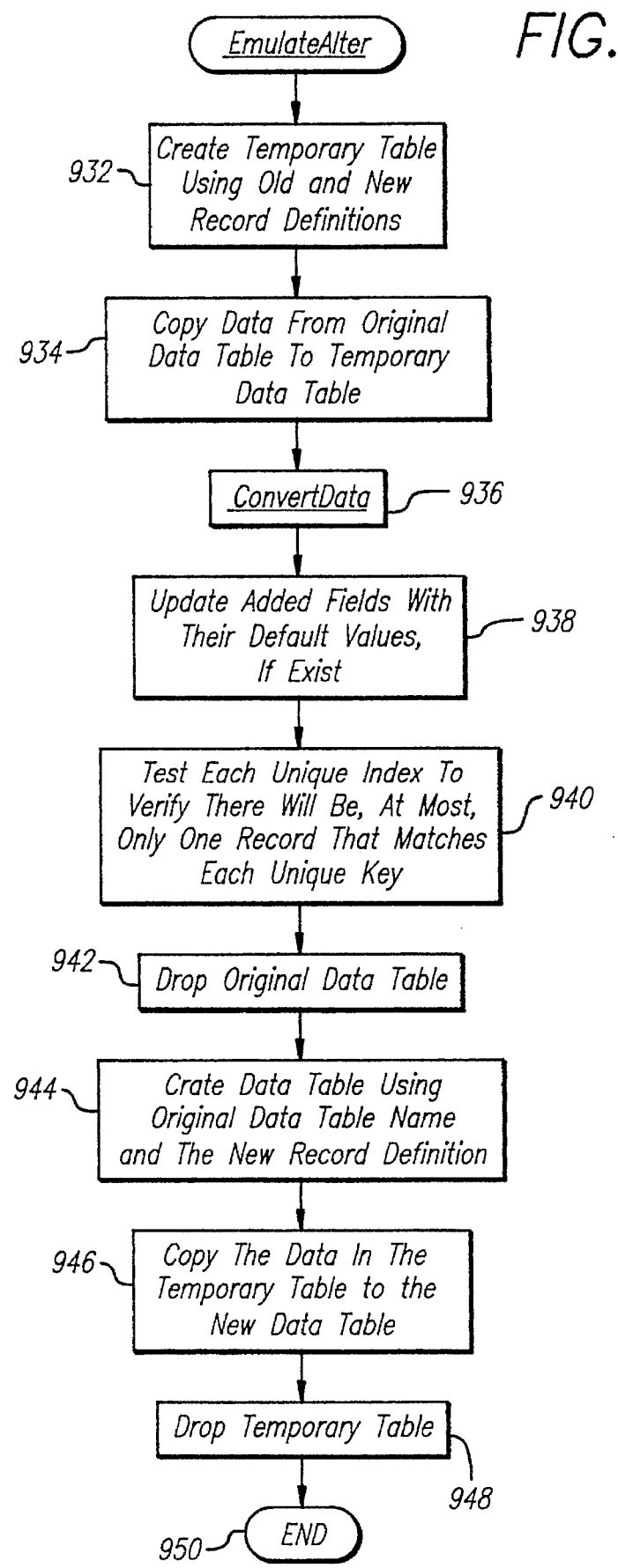
FIG. 9B provides a process flow of EmulateAlter.

FIG. 9B provides a process flow of EmulateAlter. At block 932, the temporary table is created using a combination of the old and new record definitions. At block 934, the data is copied from the original table to the temporary data table. At processing block 936, ConvertData is invoked. Default values are assigned to the new fields at block 938. At 940, unique indexes are tested to verify that there is only one record that matches each unique key.

At processing block 942, the original table is deleted. At 944, a new table is created using the original table name and the new record definition. The data is copied from the temporary data table to the new table with the original name at block 946. The temporary table is dropped at block 948. Processing returns at block 950.

Native Alter

FIGS. 9C(1) and 9C(2) provide NativeAlter process flow. At decision block 962 (i.e., "old record name=new record name?"), if the record name is being altered, processing continues at block 964. At block 964 any indexes to the old table are dropped. The table definition is altered to rename the old table to the new table name at processing block 966, and processing continues at block 968. If, at decision block 962, the record name is not being altered, processing continues at block 968.

At block 968, any indexes for the table with the new name are dropped. At 970, any views are dropped. Columns names are renamed to their new names at block 972. At 974, new columns or new versions of changed columns are added. At block 976, ConvertData is invoked. At processing block 978, added fields are updated with their default values. Each unique index is tested to verify that there is only one record that matches each unique key at block 980.

At 982, an alter command is generated and executed to set nullability according to the record definition. New versions of changed columns are renamed from their temporary names to their actual names at processing block 986. Processing returns at block 988.

Convert Data

Figure 12A:
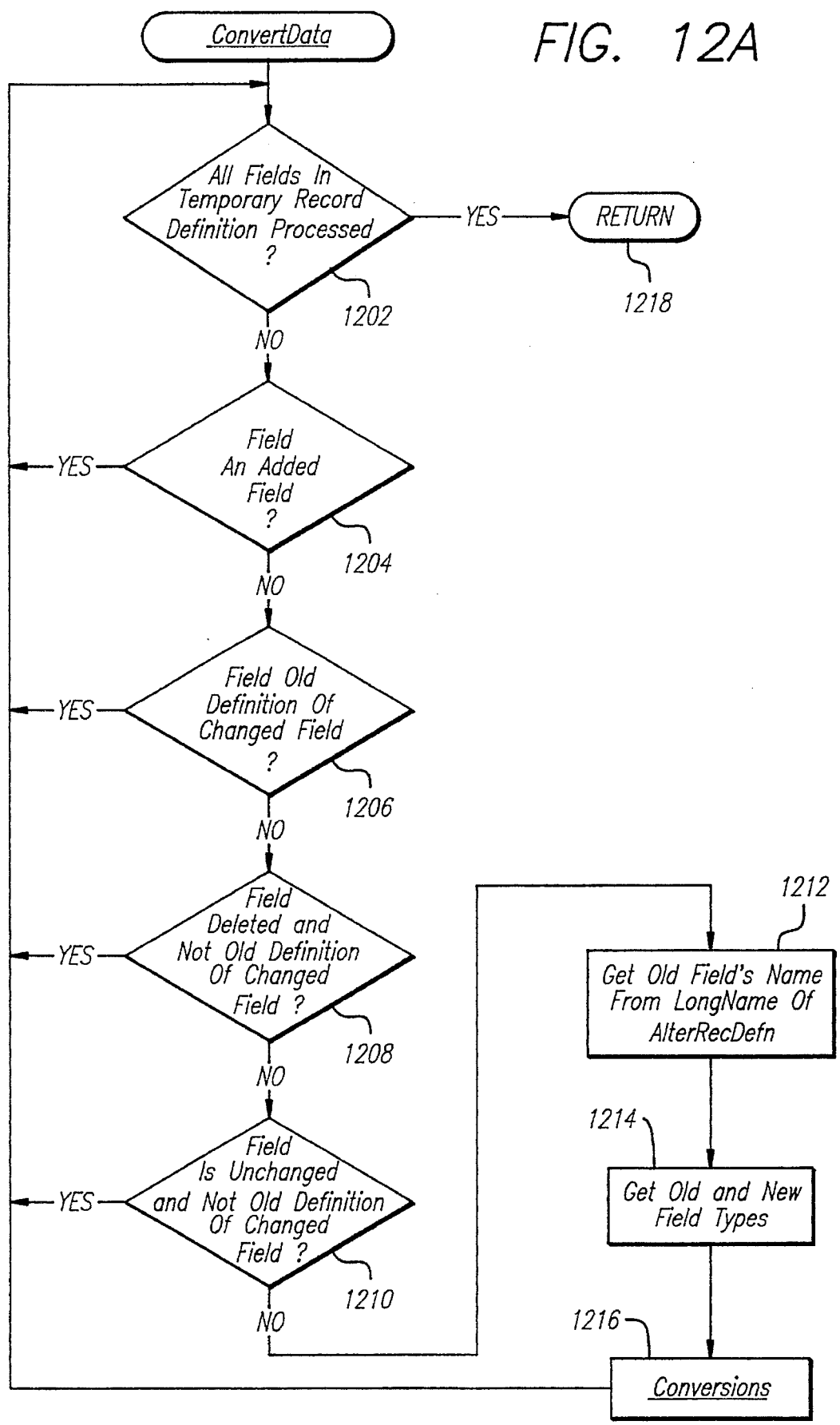
FIG. 12A provides a process flow for ConvertData.

ConvertData converts data in old fields to data in their new fields. FIG. 12A provides a process flow for ConvertData. At decision block 1202 (i.e., "all fields in temporary record definition processed?"), if all of the fields are processed, processing returns at 1218. If all fields are not processed, processing continues at decision block 1204.

At decision block 1204 (i.e., "field an added field?"), processing continues at decision block 1202. If not, processing continues at decision block 1206. At decision block 1206 (i.e., "field old definition of changed field?"), if the field is an old definition of a changed field, processing continues at decision block 1202. If not, processing continues at decision block 1208. At decision block 1208 (i.e., "field deleted and not old definition of changed field?"), if the field is a deleted field and not an old definition of a changed field, processing continues at decision block 1202.

11

If not, processing continues at decision block 1210. At decision block 1210 (i.e., "field is unchanged and not old definition or changed field?"), if the field is unchanged and not an old definition of a changed field, processing continues at decision block 1202. If not, processing continues to block 1212 to get field's old name from the LongName of the new fields definition in AlterRecDefn. At processing block 1214, the old and new field types are obtained, and Conversions is invoked at processing block 1216. Processing continues at decision block 1202.

Conversions

FIGS. 12B(1) and 12B(2) provide process flow for Conversions. At decision block 1230 (i.e., "character to character conversion?"), if the conversion is from character to character, processing continues at block 1232 to generate and execute an update statement to copy the new field's field contents to the old field, and processing returns at block 1258.

If, at decision block 1230, the conversion is not from character to character, processing continues at decision block 1234. At decision block 1234 (i.e., "small integer to character conversion?"), if the conversion is from small integer to character, processing continues at block 1236 to generate and execute an update statement to convert the new field's numeric contents into character format and copy to the old field, and processing returns at 1258.

If, at decision block 1234, if the conversion is not from small integer to character, processing continues at decision block 1238. At decision block 1238 (i.e., "small integer to integer or decimal conversion?"), if the conversion is from small integer to integer or decimal, processing continues at block 1240 to generate and execute an update statement to copy the new field's contents into the old field, and processing returns at 1258.

If, at decision block 1238, the conversion is not from small integer to integer or decimal, processing continues at decision block 1242. At decision block 1242 (i.e., "integer to character conversion?"), if the conversion is from integer to character, processing continues at block 1244 to generate and execute an update statement to convert the new field's numeric contents to character format and copy to the old field. Processing returns at 1258.

If, at decision block 1242, the conversion is not from integer to character, processing continues at decision block 1246. At decision block 1246 (i.e., integer to smallint conversion?"), if the conversion is from integer to small integer, processing continues at 1248 to generate and execute an update statement to copy the new field's contents to the old field. Processing continues at 1258.

If, at decision block 1246, the conversion is not from integer to small integer, processing continues at decision block 1250. At decision block 1250 (i.e., "decimal to character conversion?"), if the conversion is from decimal to character, processing continues at block 1256 to generate and execute an update statement to convert the new field's numeric contents into character format and copy to the old field.

If, at decision block 1250 (i.e., "decimal to character conversion?"), the conversion is not from decimal to character, processing continues at decision block 1254. At decision block 1254 (i.e., "date, time, or datetime to date, time or datetime?"), if the conversion is from date, time or datetime to date, time or datetime, processing continues at block 1256 to generate and execute an update statement to

12 convert the new field's numeric contents into character format and copy to the old field. Processing returns at 1258. If, at decision block 1254, the conversion is not from date, time or datetime to date, time or datetime, processing returns at 1258.

Thus, a method and apparatus for altering information in a database management system has been provided.

We claim:

1. A method of altering information in a database management system comprising the steps of:

generating a database catalog, said database catalog containing a system-level definition of data;

generating an application catalog, said application catalog containing application-level data definition and said system-level data definition;

specifying a modification to said application catalog;

modifying said application catalog based on said modification;

comparing said system-level data definition in said application catalog to said system-level data definition in said database catalog;

modifying said database catalog to cause said database catalog to conform to said system-level data definition in said application catalog.

2. The method of claim 1 wherein said database management system further comprises a plurality of data tables whose structure is defined by said database and application catalogs, said method further comprising the steps of:

determining whether said modification results in a loss of data;

modifying said plurality of data tables when it is determined that no loss of data will occur as a result of said modification;

committing said modification in said application catalog, database catalog, and data tables when it is determined that no loss of data will occur as a result of said modification.

3. The method of claim 1 wherein said step of modifying said application catalog further comprises the steps of:

creating an alternate record definition for one of said plurality of data tables;

determining whether a loss of data would result for a column in said one of said plurality of data tables as a result of said modification;

terminating said modification of said application catalog when it is determined that a loss of data would result from said modification.

4. The method of claim 3 wherein said step of creating an alternate record definition further comprises the steps of:

determining a current definition for said column in said one of said plurality of data tables;

searching for said column in said alternate record definition;

determining using a name change table whether a new name exists for said column when said column does not exist in said alternate record definition;

indicating that said column is deleted when said column does not exist in said alternate record definition and no new name for said column is found in said name change table;

comparing said current definition for said column with a new definition of said column when said column does exist in said alternate record definition;

when said column exists in said alternate record definition and said current definition differs from said new definition:

creating a temporary column in said alternate record definition;

marking said temporary column as an old definition of said column;

marking said column as a new definition of said column.

* * * * *